United States Patent
Myers

(10) Patent No.: US 9,830,593 B2
(45) Date of Patent: Nov. 28, 2017

(54) CRYPTOGRAPHIC CURRENCY USER DIRECTORY DATA AND ENHANCED PEER-VERIFICATION LEDGER SYNTHESIS THROUGH MULTI-MODAL CRYPTOGRAPHIC KEY-ADDRESS MAPPING

(71) Applicant: Michael Myers, San Jose, CA (US)

(72) Inventor: Michael Myers, San Jose, CA (US)

(73) Assignee: SS8 NETWORKS, INC., Milpitas, CA (US)

( * ) Notice: Subject to any disclaimer, the term of this patent is extended or adjusted under 35 U.S.C. 154(b) by 815 days.

(21) Appl. No.: 14/262,713

(22) Filed: Apr. 26, 2014

(65) Prior Publication Data

US 2015/0310424 A1 Oct. 29, 2015

(51) Int. Cl.
- *G06Q 20/36* (2012.01)
- *G06Q 20/40* (2012.01)
- *G06Q 20/22* (2012.01)
- *H04L 9/32* (2006.01)

(52) U.S. Cl.
CPC ....... *G06Q 20/3678* (2013.01); *G06Q 20/223* (2013.01); *G06Q 20/401* (2013.01); *H04L 9/3239* (2013.01); *G06F 2221/2107* (2013.01); *H04L 2209/56* (2013.01)

(58) Field of Classification Search
CPC ............. G06Q 20/3678; G06Q 20/382; G06Q 20/367; G06Q 20/10; H04L 2209/56
See application file for complete search history.

(56) References Cited

U.S. PATENT DOCUMENTS

| 5,185,860 A | 2/1993 | Wu |
| 5,444,850 A | 8/1995 | Chang |
| 5,475,819 A | 12/1995 | Miller et al. |
| 5,675,741 A | 10/1997 | Aggarwal et al. |
| 5,796,952 A | 8/1998 | Davis et al. |
| 5,835,580 A | 11/1998 | Fraser |

(Continued)

OTHER PUBLICATIONS

An Analysis of Anonymity in the Bitcoin System, by Fergal Reid and Martin Harrigan, May 7, 2012, (pp. 30) http://arxiv.org/pdf/1107.4524.pdf?origin=publication_detail.

(Continued)

*Primary Examiner* — Yonas Bayou
(74) *Attorney, Agent, or Firm* — Raj Abhyanker, P.C.

(57) ABSTRACT

Disclosed is a method and a system of cryptographic currency user directory data and enhanced peer-verification ledger synthesis through multi-modal cryptographic key-address mapping. The method determines that a propagation packet is a transaction of a cryptographic currency and extracts both an IP address and an input key-address to determine that the input key-address is under a suspected control of a user of interest. The method also determines that a relayed key-address communicated between a user of interest and a correspondent is under the suspected control of the user of interest, and/or that and/or an exhibited key-address of a web content is under the suspected control of the user of interest. The suspected control may be added to an enhanced ledger data and/or a user directory data. The system implementing one or more of the methods includes a set of collections servers, a directory server, and a wide area network.

12 Claims, 13 Drawing Sheets

(56) References Cited

U.S. PATENT DOCUMENTS

| | | |
|---|---|---|
| 5,835,720 A | 11/1998 | Nelson et al. |
| 5,862,223 A | 1/1999 | Walker et al. |
| 5,878,384 A | 3/1999 | Johnson et al. |
| 5,894,311 A | 4/1999 | Jackson |
| 5,944,790 A | 8/1999 | Levy |
| 5,954,797 A | 9/1999 | Sidey |
| 5,958,010 A | 9/1999 | Agarwal et al. |
| 5,987,430 A | 11/1999 | Van Horne et al. |
| 5,996,011 A | 11/1999 | Humes |
| 6,006,260 A | 12/1999 | Barrick, Jr. et al. |
| 6,012,088 A | 1/2000 | Li et al. |
| 6,055,542 A | 4/2000 | Nielsen et al. |
| 6,055,573 A | 4/2000 | Gardenswartz et al. |
| 6,078,956 A | 6/2000 | Bryant et al. |
| 6,112,240 A | 8/2000 | Pogue et al. |
| 6,115,742 A | 9/2000 | Franklin et al. |
| 6,119,164 A | 9/2000 | Basche |
| 6,134,592 A | 10/2000 | Montulli |
| 6,148,342 A | 11/2000 | Ho |
| 6,151,631 A | 11/2000 | Ansell et al. |
| 6,182,075 B1 | 1/2001 | Hsu |
| 6,289,341 B1 | 9/2001 | Barney |
| 6,314,460 B1 | 11/2001 | Knight et al. |
| 6,317,792 B1 | 11/2001 | Mundy et al. |
| 6,321,256 B1 | 11/2001 | Himmel et al. |
| 6,321,336 B1 | 11/2001 | Applegate et al. |
| 6,321,338 B1 | 11/2001 | Porras et al. |
| 6,327,619 B1 | 12/2001 | Blumenau |
| 6,359,557 B2 | 3/2002 | Bilder |
| 6,373,838 B1 | 4/2002 | Law et al. |
| 6,377,987 B1 | 4/2002 | Kracht |
| 6,385,024 B1 | 5/2002 | Olson |
| 6,393,460 B1 | 5/2002 | Gruen et al. |
| 6,393,461 B1 | 5/2002 | Okada et al. |
| 6,393,479 B1 | 5/2002 | Glommen et al. |
| 6,404,860 B1 | 6/2002 | Casellini |
| 6,425,007 B1 | 7/2002 | Messinger |
| 6,442,590 B1 | 8/2002 | Inala et al. |
| 6,449,604 B1 | 9/2002 | Hansen et al. |
| 6,466,981 B1 | 10/2002 | Levy |
| 6,466,984 B1 | 10/2002 | Naveh et al. |
| 6,470,386 B1 | 10/2002 | Combar et al. |
| 6,487,538 B1 | 11/2002 | Gupta et al. |
| 6,507,869 B1 | 1/2003 | Franke et al. |
| 6,516,345 B1 | 2/2003 | Kracht |
| 6,564,261 B1 | 5/2003 | Gudjonsson et al. |
| 6,591,251 B1 | 7/2003 | Leon et al. |
| 6,606,657 B1 | 8/2003 | Zilberstein et al. |
| 6,658,465 B1 | 12/2003 | Touboul |
| 6,665,715 B1 | 12/2003 | Houri |
| 6,678,720 B1 | 1/2004 | Matsumoto et al. |
| 6,714,977 B1 | 3/2004 | Fowler et al. |
| 6,721,726 B1 | 4/2004 | Swaminathan et al. |
| 6,725,377 B1 | 4/2004 | Kouznetsov |
| 6,760,761 B1 | 7/2004 | Sciacca |
| 6,782,421 B1 | 8/2004 | Soles et al. |
| 6,792,458 B1 | 9/2004 | Muret et al. |
| 6,795,856 B1 | 9/2004 | Bunch |
| 6,804,701 B2 | 10/2004 | Muret et al. |
| 6,892,226 B1 | 5/2005 | Tso et al. |
| 6,925,454 B2 | 8/2005 | Lam et al. |
| 6,941,321 B2 | 9/2005 | Schuetze et al. |
| 6,957,229 B1 | 10/2005 | Dyor |
| 6,973,577 B1 | 12/2005 | Kouznetsov |
| 6,981,047 B2 | 12/2005 | Hanson et al. |
| 6,983,317 B1 | 1/2006 | Bishop et al. |
| 6,985,901 B1 | 1/2006 | Sachse et al. |
| 7,006,508 B2 | 2/2006 | Bondy et al. |
| 7,027,398 B2 | 4/2006 | Fang |
| 7,027,416 B1 | 4/2006 | Kriz |
| 7,031,941 B2 | 4/2006 | Garrow et al. |
| 7,039,699 B1 | 5/2006 | Narin et al. |
| 7,046,247 B2 | 5/2006 | Hao et al. |
| 7,047,294 B2 | 5/2006 | Johnson et al. |
| 7,050,396 B1 | 5/2006 | Cohen et al. |
| 7,055,174 B1 | 5/2006 | Cope et al. |
| 7,058,704 B1 | 6/2006 | Mangipudi et al. |
| 7,058,976 B1 | 6/2006 | Dark |
| 7,076,275 B1 | 7/2006 | Karstens et al. |
| 7,083,095 B2 | 8/2006 | Hendrick |
| 7,093,020 B1 | 8/2006 | McCarty et al. |
| 7,143,151 B1 | 11/2006 | Kayashima et al. |
| 7,152,103 B1 | 12/2006 | Ryan et al. |
| 7,152,108 B1 | 12/2006 | Khan et al. |
| 7,152,242 B2 | 12/2006 | Douglas |
| 7,171,681 B1 | 1/2007 | Duncan et al. |
| 7,203,674 B2 | 4/2007 | Cohen |
| 7,206,835 B2 | 4/2007 | Kusumoto et al. |
| 7,212,491 B2 | 5/2007 | Koga |
| 7,216,110 B1 | 5/2007 | Ogg et al. |
| 7,228,566 B2 | 6/2007 | Caceres et al. |
| 7,231,448 B1 | 6/2007 | O'Steen et al. |
| 7,246,162 B2 | 7/2007 | Tindal |
| 7,257,722 B2 | 8/2007 | Sone |
| 7,277,938 B2 | 10/2007 | Duimovich et al. |
| 7,277,941 B2 | 10/2007 | Ignatius et al. |
| 7,278,037 B2 | 10/2007 | Sone |
| 7,313,625 B2 | 12/2007 | Tindal et al. |
| 7,328,242 B1 | 2/2008 | McCarthy et al. |
| 7,346,658 B2 | 3/2008 | Simpson |
| 7,356,576 B2 | 4/2008 | Rabe |
| 7,359,967 B1 | 4/2008 | Synnestvedt et al. |
| 7,373,399 B2 | 5/2008 | Steele et al. |
| 7,376,722 B1 | 5/2008 | Sim et al. |
| 7,386,613 B2 | 6/2008 | Piccirilli et al. |
| 7,386,883 B2 | 6/2008 | Bardsley et al. |
| 7,406,516 B2 | 7/2008 | Davis et al. |
| 7,437,444 B2 | 10/2008 | Houri |
| 7,437,761 B2 | 10/2008 | Takahashi |
| 7,447,909 B2 | 11/2008 | Reith |
| 7,466,690 B2 | 12/2008 | Schrodi |
| 7,472,412 B2 | 12/2008 | Wolf et al. |
| 7,474,617 B2 | 1/2009 | Molen et al. |
| 7,478,161 B2 | 1/2009 | Bernet et al. |
| 7,490,065 B1 | 2/2009 | Ogg et al. |
| 7,496,049 B2 | 2/2009 | Estrada et al. |
| 7,506,072 B2 | 3/2009 | Waldorf et al. |
| 7,523,191 B1 | 4/2009 | Thomas et al. |
| 7,526,541 B2 | 4/2009 | Roese et al. |
| 7,535,993 B2 | 5/2009 | Cai et al. |
| 7,536,459 B2 | 5/2009 | Johnson et al. |
| 7,570,743 B2 | 8/2009 | Barclay et al. |
| 7,571,237 B2 | 8/2009 | Pfitzmann |
| 7,580,356 B1 | 8/2009 | Mishra et al. |
| 7,587,453 B2 | 9/2009 | Bhrara et al. |
| 7,587,757 B2 | 9/2009 | Scoggins et al. |
| 7,617,160 B1 | 11/2009 | Grove et al. |
| 7,624,144 B1 | 11/2009 | Mitrov |
| 7,627,664 B2 | 12/2009 | Sutou et al. |
| 7,631,007 B2 | 12/2009 | Morris |
| 7,636,680 B2 | 12/2009 | Gatto |
| 7,639,613 B1 | 12/2009 | Ghannadian et al. |
| 7,647,406 B2 | 1/2010 | Liu |
| 7,657,540 B1 | 2/2010 | Bayliss |
| 7,664,974 B2 | 2/2010 | Sone |
| 7,676,570 B2 | 3/2010 | Levy et al. |
| 7,698,457 B2 | 4/2010 | Ghetie et al. |
| 7,730,120 B2 | 6/2010 | Singh et al. |
| 7,747,737 B1 | 6/2010 | Apte et al. |
| 7,769,851 B1 | 8/2010 | Guruswamy et al. |
| 7,779,073 B2 | 8/2010 | Hoile et al. |
| 7,809,826 B1 | 10/2010 | Guruswamy |
| 7,835,406 B2 | 11/2010 | Oran et al. |
| 7,852,849 B2 | 12/2010 | Davidson et al. |
| 7,873,719 B2 | 1/2011 | Bishop et al. |
| 7,885,194 B1 | 2/2011 | Narin et al. |
| 7,886,049 B2 | 2/2011 | Adelstein et al. |
| 7,904,478 B2 | 3/2011 | Yu et al. |
| 7,904,554 B1 | 3/2011 | Lu et al. |
| 7,933,926 B2 | 4/2011 | Ebert |
| 7,941,507 B1 | 5/2011 | Murphy, Jr. et al. |
| 7,953,851 B2 | 5/2011 | Britton et al. |
| 7,958,233 B2 | 6/2011 | Fernández Gutierrez |
| 7,958,267 B1 | 6/2011 | Eiras et al. |

(56) References Cited

U.S. PATENT DOCUMENTS

| | | |
|---|---|---|
| 7,975,046 B2 | 7/2011 | Sheppard |
| 7,979,521 B2 | 7/2011 | Greaves et al. |
| 7,979,529 B2 | 7/2011 | Kreusch et al. |
| 7,984,138 B2 | 7/2011 | Bantz et al. |
| 7,996,493 B2 | 8/2011 | Hill |
| 8,001,246 B2 | 8/2011 | Lu et al. |
| 8,010,085 B2 | 8/2011 | Apte et al. |
| 8,010,602 B2 | 8/2011 | Shen et al. |
| 8,010,689 B2 | 8/2011 | Deninger et al. |
| 8,014,303 B2 | 9/2011 | Narin et al. |
| 8,015,277 B2 | 9/2011 | Brown et al. |
| 8,032,701 B1 | 10/2011 | Glade et al. |
| 8,041,022 B1 | 10/2011 | Andreasen et al. |
| 8,051,130 B2 | 11/2011 | Logan et al. |
| 8,051,168 B1 | 11/2011 | Boysko et al. |
| 8,055,709 B2 | 11/2011 | Singh et al. |
| 8,059,790 B1 | 11/2011 | Paterik et al. |
| 8,065,247 B2 | 11/2011 | Schlottmann |
| 8,077,704 B2 | 12/2011 | Yin et al. |
| 8,078,679 B2 | 12/2011 | Kajekar et al. |
| 8,090,852 B2 | 1/2012 | Ianchici et al. |
| 8,099,500 B2 | 1/2012 | Deason |
| 8,117,314 B2 | 2/2012 | Croft et al. |
| 8,127,005 B2 | 2/2012 | Fernández Gutierrez |
| 8,135,134 B2 | 3/2012 | Orsini et al. |
| 8,135,833 B2 | 3/2012 | Cancel et al. |
| 8,140,319 B2 | 3/2012 | Wasser |
| 8,145,753 B2 | 3/2012 | Inoue et al. |
| 8,156,155 B1 | 4/2012 | Yu et al. |
| 8,200,809 B2 | 6/2012 | Sheppard |
| 8,204,884 B2 | 6/2012 | Freedman et al. |
| 8,230,056 B2 | 7/2012 | Bishop et al. |
| 8,234,368 B1 | 7/2012 | Nielsen et al. |
| 8,244,859 B2 | 8/2012 | Ramakrishnan et al. |
| 8,281,027 B2 | 10/2012 | Martinez et al. |
| 8,281,175 B2 | 10/2012 | Blackburn et al. |
| 8,281,360 B2 | 10/2012 | Flewallen et al. |
| 8,316,134 B2 | 11/2012 | Tanimoto |
| 8,321,515 B1 | 11/2012 | Gailloux et al. |
| 8,327,012 B1 | 12/2012 | Nguyen et al. |
| 8,332,477 B1 | 12/2012 | Kaiserlian et al. |
| 8,332,507 B2 | 12/2012 | Wagh et al. |
| 8,352,590 B2 | 1/2013 | Sankaran et al. |
| 8,375,118 B2 | 2/2013 | Hao et al. |
| 8,380,234 B2 | 2/2013 | Kronander et al. |
| 8,380,863 B2 | 2/2013 | Natarajan et al. |
| 8,396,075 B2 | 3/2013 | Skoczkowski et al. |
| 8,407,038 B2 | 3/2013 | Bizzarri et al. |
| 8,407,340 B2 | 3/2013 | Zamora Cura |
| 8,416,695 B2 | 4/2013 | Liu et al. |
| 8,438,089 B1 | 5/2013 | Wasserblat et al. |
| 8,443,041 B1 | 5/2013 | Krantz et al. |
| 8,462,160 B2 | 6/2013 | Lindsay et al. |
| 8,468,241 B1 | 6/2013 | Raizen et al. |
| 8,468,244 B2 | 6/2013 | Redlich et al. |
| 8,478,879 B2 | 7/2013 | Brown et al. |
| 8,479,212 B2 | 7/2013 | Jamjoom et al. |
| 8,527,577 B2 | 9/2013 | Lu et al. |
| 8,542,592 B2 | 9/2013 | Moisand et al. |
| 8,542,676 B2 | 9/2013 | Lakhani et al. |
| 8,544,023 B2 | 9/2013 | Sim-Tang et al. |
| 8,572,252 B2 | 10/2013 | Ahuja et al. |
| 8,589,516 B2 | 11/2013 | Wheeler et al. |
| 8,595,490 B2 | 11/2013 | Von Mueller et al. |
| 8,599,747 B1 | 12/2013 | Saleem et al. |
| 8,620,353 B1 | 12/2013 | Kahn et al. |
| 8,621,090 B2 | 12/2013 | Bustamente |
| 8,626,860 B1 | 1/2014 | Gailloux et al. |
| 8,626,901 B2 | 1/2014 | Pugh et al. |
| 8,627,479 B2 | 1/2014 | Wittenstein et al. |
| 8,630,836 B2 | 1/2014 | Wasser |
| 8,630,854 B2 | 1/2014 | Marvit |
| 8,634,423 B1 | 1/2014 | Olding et al. |
| 8,645,453 B2 | 2/2014 | Cheng et al. |
| 8,655,939 B2 | 2/2014 | Redlich et al. |
| 8,661,125 B2 | 2/2014 | Avner et al. |
| 8,698,872 B2 | 4/2014 | Begeja et al. |
| 8,712,019 B2 | 4/2014 | Anchan et al. |
| 8,713,453 B2 | 4/2014 | Shahine et al. |
| 8,719,896 B2 | 5/2014 | Poulsen et al. |
| 8,725,869 B1 | 5/2014 | Reiner et al. |
| 8,756,312 B2 | 6/2014 | Malloy et al. |
| 8,769,059 B1 | 7/2014 | Chheda et al. |
| 8,782,283 B2 | 7/2014 | Attanasio |
| 8,793,395 B2 | 7/2014 | Cadiou et al. |
| 8,810,577 B2 | 8/2014 | De Pauw et al. |
| 8,812,740 B2 | 8/2014 | Li et al. |
| 8,813,090 B2 | 8/2014 | Jamjoom et al. |
| 2001/0052081 A1 | 12/2001 | McKibben et al. |
| 2002/0026505 A1 | 2/2002 | Terry |
| 2002/0042821 A1 | 4/2002 | Muret et al. |
| 2002/0078382 A1 | 6/2002 | Sheikh et al. |
| 2002/0099818 A1 | 7/2002 | Russell et al. |
| 2002/0174235 A1 | 11/2002 | Likourezos |
| 2003/0023715 A1 | 1/2003 | Reiner et al. |
| 2003/0043820 A1 | 3/2003 | Goringe et al. |
| 2003/0059017 A1 | 3/2003 | Cugalj et al. |
| 2003/0065605 A1 | 4/2003 | Gatto |
| 2003/0074369 A1 | 4/2003 | Schuetze et al. |
| 2003/0120822 A1 | 6/2003 | Langrind et al. |
| 2003/0140131 A1 | 7/2003 | Chandrashekhar et al. |
| 2003/0214504 A1 | 11/2003 | Hao et al. |
| 2004/0022191 A1 | 2/2004 | Bernet et al. |
| 2004/0049693 A1 | 3/2004 | Douglas |
| 2004/0105424 A1 | 6/2004 | Skoczkowski et al. |
| 2004/0181599 A1 | 9/2004 | Kreusch et al. |
| 2004/0199623 A1 | 10/2004 | Houri |
| 2004/0202295 A1 | 10/2004 | Shen et al. |
| 2004/0215770 A1 | 10/2004 | Maher, III et al. |
| 2004/0243704 A1 | 12/2004 | Botelho et al. |
| 2004/0249938 A1 | 12/2004 | Bunch |
| 2004/0255126 A1 | 12/2004 | Reith |
| 2004/0267729 A1 | 12/2004 | Swaminathan et al. |
| 2005/0013259 A1 | 1/2005 | Papoushado et al. |
| 2005/0060102 A1 | 3/2005 | O'Reilly et al. |
| 2005/0076117 A1 | 4/2005 | Hou et al. |
| 2005/0174937 A1 | 8/2005 | Scoggins et al. |
| 2005/0210409 A1 | 9/2005 | Jou |
| 2005/0246419 A1 | 11/2005 | Jaatinen |
| 2006/0015613 A1 | 1/2006 | Greaves |
| 2006/0026268 A1 | 2/2006 | Sanda |
| 2006/0041660 A1 | 2/2006 | Bishop et al. |
| 2006/0064391 A1 | 3/2006 | Petrov et al. |
| 2006/0168332 A1 | 7/2006 | Pfitzmann |
| 2006/0230037 A1 | 10/2006 | Sugiyama et al. |
| 2007/0005713 A1 | 1/2007 | LeVasseur et al. |
| 2007/0055766 A1 | 3/2007 | Petropoulakis et al. |
| 2007/0118640 A1 | 5/2007 | Subramanian et al. |
| 2007/0156889 A1 | 7/2007 | Bhrara et al. |
| 2007/0203991 A1 | 8/2007 | Fisher et al. |
| 2007/0266145 A1 | 11/2007 | Nesbitt et al. |
| 2007/0299964 A1 | 12/2007 | Wong et al. |
| 2008/0028031 A1 | 1/2008 | Bailey et al. |
| 2008/0036767 A1 | 2/2008 | Janzen |
| 2008/0052392 A1 | 2/2008 | Webster et al. |
| 2008/0147623 A1 | 6/2008 | Swaminathan et al. |
| 2008/0162397 A1 | 7/2008 | Zaltzman |
| 2008/0183867 A1 | 7/2008 | Singh et al. |
| 2009/0077623 A1 | 3/2009 | Baum et al. |
| 2009/0132450 A1 | 5/2009 | Schlottmann |
| 2009/0150472 A1 | 6/2009 | Devarakonda et al. |
| 2009/0164629 A1 | 6/2009 | Klein et al. |
| 2009/0165142 A1 | 6/2009 | Adelstein et al. |
| 2009/0171960 A1 | 7/2009 | Katzir |
| 2009/0193037 A1 | 7/2009 | Yu et al. |
| 2009/0254572 A1 | 10/2009 | Redlich et al. |
| 2009/0254653 A1 | 10/2009 | Kowa et al. |
| 2010/0042545 A1 | 2/2010 | Ogg et al. |
| 2010/0057858 A1 | 3/2010 | Shen et al. |
| 2010/0071053 A1 | 3/2010 | Ansari et al. |
| 2010/0079464 A1 | 4/2010 | Matsumura |
| 2010/0086119 A1 | 4/2010 | De Luca et al. |
| 2010/0094910 A1 | 4/2010 | Bayliss |
| 2010/0095017 A1 | 4/2010 | Ghetie et al. |

(56) References Cited

U.S. PATENT DOCUMENTS

| | | |
|---|---|---|
| 2010/0115018 A1 | 5/2010 | Yoon et al. |
| 2010/0150138 A1 | 6/2010 | Bjorsell et al. |
| 2010/0169234 A1 | 7/2010 | Metzger et al. |
| 2010/0169479 A1 | 7/2010 | Jeong et al. |
| 2010/0180029 A1* | 7/2010 | Fourman ............ G06F 17/30867 709/225 |
| 2010/0182320 A1 | 7/2010 | Cartan |
| 2010/0199189 A1 | 8/2010 | Ben-Aroya et al. |
| 2010/0211672 A1 | 8/2010 | Brown et al. |
| 2010/0217837 A1 | 8/2010 | Ansari et al. |
| 2010/0228854 A1 | 9/2010 | Morrison et al. |
| 2010/0250497 A1 | 9/2010 | Redlich et al. |
| 2010/0281161 A1 | 11/2010 | Cohn et al. |
| 2010/0287286 A1 | 11/2010 | Bustamente |
| 2010/0309786 A1 | 12/2010 | Moisand et al. |
| 2010/0312884 A1 | 12/2010 | Nandy et al. |
| 2010/0312903 A1 | 12/2010 | Miyata |
| 2010/0318647 A1 | 12/2010 | Savoor et al. |
| 2010/0321183 A1 | 12/2010 | Donovan et al. |
| 2010/0333116 A1 | 12/2010 | Prahlad et al. |
| 2011/0010449 A1 | 1/2011 | Andrews et al. |
| 2011/0029667 A1 | 2/2011 | Imbimbo et al. |
| 2011/0030067 A1 | 2/2011 | Wilson |
| 2011/0047273 A1 | 2/2011 | Young, Jr. et al. |
| 2011/0161507 A1 | 6/2011 | O'Sullivan et al. |
| 2011/0173330 A1 | 7/2011 | Gong et al. |
| 2011/0182205 A1 | 7/2011 | Gerdes et al. |
| 2011/0206198 A1 | 8/2011 | Freedman et al. |
| 2011/0208859 A1 | 8/2011 | Fernández Gutierrez |
| 2011/0214187 A1 | 9/2011 | Wittenstein et al. |
| 2011/0252032 A1 | 10/2011 | Fitzgerald et al. |
| 2011/0252138 A1 | 10/2011 | Ahuja et al. |
| 2011/0270977 A1 | 11/2011 | Ansiaux et al. |
| 2011/0282981 A1 | 11/2011 | Cutler et al. |
| 2011/0283343 A1 | 11/2011 | Jaeger et al. |
| 2011/0289134 A1 | 11/2011 | De Los Reyes et al. |
| 2011/0296014 A1 | 12/2011 | Cancel et al. |
| 2012/0005331 A1 | 1/2012 | Beattie, Jr. et al. |
| 2012/0016715 A1 | 1/2012 | Brown et al. |
| 2012/0030729 A1 | 2/2012 | Schwartz et al. |
| 2012/0078708 A1 | 3/2012 | Taylor et al. |
| 2012/0084081 A1 | 4/2012 | Melamed et al. |
| 2012/0084288 A1 | 4/2012 | Abdul-Razzak et al. |
| 2012/0096145 A1 | 4/2012 | Le et al. |
| 2012/0110062 A1 | 5/2012 | Savage et al. |
| 2012/0117236 A1 | 5/2012 | Fukuda et al. |
| 2012/0131474 A1 | 5/2012 | Panchadsaram et al. |
| 2012/0143972 A1 | 6/2012 | Malik et al. |
| 2012/0143973 A1 | 6/2012 | Niewerth |
| 2012/0150955 A1 | 6/2012 | Tseng |
| 2012/0158955 A1 | 6/2012 | Kim et al. |
| 2012/0191854 A1 | 7/2012 | Bharatia et al. |
| 2012/0197976 A1 | 8/2012 | Welingkar et al. |
| 2012/0203847 A1 | 8/2012 | Kendall et al. |
| 2012/0210120 A1 | 8/2012 | Irvine |
| 2012/0210427 A1 | 8/2012 | Bronner et al. |
| 2012/0224021 A1 | 9/2012 | Begeja et al. |
| 2012/0239805 A1 | 9/2012 | Savoor et al. |
| 2012/0239809 A1 | 9/2012 | Mazumdar et al. |
| 2012/0254403 A1 | 10/2012 | Imbimbo et al. |
| 2012/0259975 A1 | 10/2012 | Le et al. |
| 2012/0265824 A1 | 10/2012 | Lawbaugh |
| 2012/0266081 A1 | 10/2012 | Kao |
| 2012/0317196 A1 | 12/2012 | Schigel et al. |
| 2012/0324470 A1 | 12/2012 | Jamjoom et al. |
| 2012/0331126 A1 | 12/2012 | Abdul-Razzak et al. |
| 2013/0007129 A1 | 1/2013 | German et al. |
| 2013/0024506 A1 | 1/2013 | Setton |
| 2013/0054749 A1 | 2/2013 | Yao et al. |
| 2013/0061049 A1 | 3/2013 | Irvine |
| 2013/0091241 A1 | 4/2013 | Goetz et al. |
| 2013/0097308 A1 | 4/2013 | Le et al. |
| 2013/0145289 A1 | 6/2013 | Abdul-Razzak et al. |
| 2013/0155068 A1 | 6/2013 | Bier et al. |
| 2013/0159234 A1 | 6/2013 | Xing et al. |
| 2013/0162648 A1 | 6/2013 | Abdul-Razzak et al. |
| 2013/0191493 A1 | 7/2013 | Le et al. |
| 2013/0207980 A1 | 8/2013 | Ankisettipalli et al. |
| 2013/0262622 A1 | 10/2013 | Li et al. |
| 2013/0268443 A1 | 10/2013 | Petrov et al. |
| 2013/0275306 A1 | 10/2013 | Ignatchenko et al. |
| 2013/0293551 A1 | 11/2013 | Erez et al. |
| 2013/0304761 A1 | 11/2013 | Redlich et al. |
| 2013/0311557 A1 | 11/2013 | Aston Motes et al. |
| 2014/0032170 A1 | 1/2014 | Pauw et al. |
| 2014/0059024 A1 | 2/2014 | Le et al. |
| 2014/0082087 A1 | 3/2014 | Bustamente |
| 2014/0086102 A1 | 3/2014 | Doddapaneni |
| 2014/0149487 A1 | 5/2014 | Dikmen et al. |
| 2014/0150077 A1 | 5/2014 | Roy et al. |
| 2014/0201057 A1* | 7/2014 | Shuster ................ G06Q 20/065 705/37 |
| 2014/0222522 A1 | 8/2014 | Chait |
| 2014/0244506 A1* | 8/2014 | Gramling ............... G06Q 20/40 705/44 |
| 2014/0310243 A1* | 10/2014 | McGee ............ G06F 17/30575 707/639 |
| 2015/0205929 A1* | 7/2015 | Brama ................ G06F 19/3418 705/3 |
| 2015/0220918 A1* | 8/2015 | Davis ...................... G06F 21/32 705/44 |
| 2015/0220928 A1* | 8/2015 | Allen .................. G06Q 20/0655 705/67 |
| 2015/0227890 A1* | 8/2015 | Bednarek ......... G06Q 10/08355 705/26.81 |
| 2015/0228004 A1* | 8/2015 | Bednarek ........... G06Q 30/0633 705/26.8 |
| 2015/0269539 A1* | 9/2015 | MacGregor .......... G06Q 20/065 705/39 |
| 2015/0287026 A1* | 10/2015 | Yang .................. G06Q 20/3678 705/69 |
| 2015/0294308 A1* | 10/2015 | Pauker ............... G06Q 20/3827 705/67 |
| 2015/0302401 A1* | 10/2015 | Metral ............... G06Q 20/3829 705/71 |

OTHER PUBLICATIONS

"Visualizing criminal relationships: comparison of a hyperbolic tree and a hierarchical list", by Yang Xiang et al., Jul. 14, 2005 (pp. 15) http://ai.arizona.edu/intranet/papers/VisualizingCriminalRelationships.pdf.

"Securing Public Instant Messaging (IM) At Work", by Nigel Williams, Joanne Ly, Jul. 2004 (pp. 43) http://caia.swin.edu.au/reports/040726A/CAIA-TR-040726A.pdf.

"Network Element Service Specification Template", by S. Shenker et al., Sep. 1997 (pp. 22) http://tools.ietf.org/pdf/rfc2216.pdf.

"RSVP+: An Extension to RSVP", by Silvano Gai et al., Jun. 1999 (pp. 18) http://tools.ietf.org/pdf/draft-sgai-rsvp-plus-00.pdf.

"Cellular access control and charging for mobile operator wireless local area networks", by H. Haverinen et al., Jan. 14, 2003 (p. 1) http://ieeexplore.ieee.org/xpl/articleDetails.jsp?tp=&arnumber=1160081.

"An Analysis of Anonymity in the Bitcoin System", by Reid Fergal et al., May 7, 2012 (pp. 30) http://arxiv.org/pdf/1107.4524.pdf?origin=publication_detail.

* cited by examiner

| FIELD SIZE | DESCRIPTION | DATA |
|---|---|---|
| 4 | version | 01 00 00 00 |
| 1+ | input count | 1 |
| 41+ | TRANSACTIONAL HASH 302 (transactional hash) INPUT 306 (input) | 48 4d 40 d4 5b 9e a0 d6 52 fc a8 25 8a b7 ca a4 25 41 eb 52 97 58 57 f9 6f b5 0c d7 32 c8 b4 81 |
| | previous output index | 00 00 00 00 |
| | script length | 8a |
| | scriptSig | 47 30 44 02 20 2c b2 65 bf 10 70 7b f4 93 46 c3 51 5d d3 d1 6f c4 54 61 8c 58 ec 0a 0f f4 48 a6 76 c5 4f f7 13 02 20 6c 66 24 d7 62 a1 fc ef 46 18 28 4e ad 8f 08 67 8a c0 5b 13 c8 42 35 f1 65 4e 6a d1 68 23 3e 82 01 41 04 14 e3 01 b2 32 8f 17 44 2c 0b 83 10 d7 87 bf 3d 8a 40 4c fb d0 70 4f 13 5b 6a d4 b2 d3 ee 75 13 10 f9 81 92 6e 53 a6 e8 c3 9b d7 d3 fe fd 57 6c 54 3c ce 49 3c ba c0 63 88 f2 65 1d 1a ac bf Cd |
| | INDEX 309 | |
| | sequence | ff ff ff ff |
| 1+ | output count (output count) OUTPUT 308 (output) | 1 |
| 9+ | Value of the transaction 314 | 62 64 01 00 00 00 00 00 |
| | script length | 19 |
| | key-address PUBLIC KEY-ADDRESS 300 | 76 a9 14 c8 e9 09 96 c7 c6 08 0e e0 62 84 60 0c 68 4e d9 04 d1 4c 5c 88 ac |
| 4 | block lock time | 00 00 00 00 |

PROTOCOL SPECIFICATION 400

RAW TRANSACTION DATA 404

CRYPTOCURRENCY TRANSACTION SPECIFICATION AND RAW DATA INTERCEPTION VIEW 450

FIGURE 4

| BLOCK NUMBER 1000 | BLOCK HASH 1002 | TIME 1004 | NUMBER OF TRANSACTIONS 1006 | TOTAL BTC 1008 | SIZE (KB) 1010 | USER ACTIVITY 1012 | ALERTS 1014 |
|---|---|---|---|---|---|---|---|
| 295229 | 3e96e37c59... | 4/11/2014 9:17 | 461 | 5334.8152341 | 238.723 | User 1, User 2 | Alert |
| 295228 | b26c459980... | 4/11/2014 8:56 | 303 | 2945.3332 | 163.944 | | |
| 295227 | 8abf62c1a5... | 4/11/2014 8:48 | 342 | 4893.87825 | 181.083 | | |
| 295226 | 1bc6827be8... | 4/11/2014 8:42 | 144 | 1499.718518 | 80.031 | | |
| 295225 | 9e18c681d5... | 4/11/2014 8:30 | 45 | 993.6599105 | 25.643 | | |
| 295224 | 3fd7983017... | 4/11/2014 8:35 | 298 | 3382.912093 | 221.647 | | |
| 295223 | 2924ef4501... | 4/11/2014 8:27 | 394 | 5093.03353 | 163.245 | User 3 | Alert |
| 295222 | a8570389ad... | 4/11/2014 8:17 | 728 | 10893.36575 | 418.755 | | |
| 295221 | 7d9b99b711... | 4/11/2014 7:54 | 307 | 3628.732142 | 134.239 | | |
| 295220 | 5608c83882... | 4/11/2014 7:46 | 16 | 524.9408569 | 8.19 | | |
| 295219 | 59cc33942b... | 4/11/2014 7:45 | 195 | 6524.063983 | 454.395 | | |
| 295218 | 1cea260573... | 4/11/2014 7:44 | 746 | 19068.84842 | 338.845 | | |
| 295217 | 6435e78548... | 4/11/2014 7:28 | 87 | 1034.146238 | 64.138 | User 2, User 4 | |
| 295216 | 451b34ded9... | 4/11/2014 7:21 | 150 | 1493.314663 | 62.315 | | |
| 295215 | 7261945544... | 4/11/2014 7:17 | 128 | 4272.376131 | 252.76 | | |
| 295214 | a00d937ced... | 4/11/2014 7:17 | 407 | 3679.811904 | 213.753 | | |
| 295213 | 96fe058f50... | 4/11/2014 7:08 | 32 | 630.8881339 | 11.635 | User 1 | |
| 295212 | 5a4ea6ce27... | 4/11/2014 7:06 | 415 | 2849.014692 | 308.893 | | |
| 295211 | 757a42b06a... | 4/11/2014 6:57 | 256 | 1556.220532 | 124.615 | | |
| 295210 | 52e2603795... | 4/11/2014 6:55 | 256 | 2720.102199 | 101.246 | | |

ENHANCED PEER-VERIFICATION LEDGER SUMMARY VIEW 1050

FIGURE 10

| Block 295228 | | | | | | | | ENHANCED TRANSACTION ENTRY 202 |
|---|---|---|---|---|---|---|---|---|
| TRANSACTION | FEE | SIZE (KB) | FROM (NAME) | FROM (AMOUNT) | | TO (NAME) | TO (AMOUNT) | |
| a2aecf0722... | 0 | 0.168 | N/A | Generation 25 + 0.08074639 total fees | | Unknown | 14cZMQk89mRYQk.....i5H6uer: 25.08074639 | |
| a8eff390d1... | 0.0001 | 0.225 | User 1 (Verified) | 1PFBGeyAUH....9Fuks: 3590.2998 | | User 2 (Suspected 4) User 1 (Verified) | 1EQQPKtGmvmLuP.....KQxmcEaP3: 180 1PFBGeyAUH6ncV.....9Fuks: 3410.29979696 | |
| 0657f2f3e4... | 0 | 0.226 | Unknown | 1ECKmgdfvDPN....t5jiY: 9.9999 | | Unknown Unknown | 1NfFXRUZqKAv2t6Z.....b3hPqdVB: 5 1ECtKFBnXb88fDjrk.....BuIR: 4.999975 | |
| | | | Unknown | 1Q73YpvsLHK.....x8piM6: 27.3420 1Q73YpvsLHK.....x8piM6: 14.8890 1Q73YpvsLHK.....x8piM6: 25.3411 1TreogchkFKD.....XvYc1Cz: 0.0104 1Q73YpvsLHK.....x8piM6: 30.6116 1Q73YpvsLHK.....x8piM6: 25.4421 1Q73YpvsLHK.....x8piM6: 34.7564 1Q73YpvsLHK.....x8piM6: 8.2136 1Q73YpvsLHK.....x8piM6: 12.6637 1Q73YpvsLHK.....x8piM6: 26.5032 1Q73YpvsLHK.....x8piM6: 35.0083 1Q73YpvsLHK.....x8piM6: 30.1588 1Q73YpvsLHK.....x8piM6: 29.6511 | | User 2 (Suspected – Certainty 5) User X (suspected - Certainty 3) | 1Q6GE1X6oZY9zG9.....XuHH6: 0.010311 1J6YYhMwttdd4XiHX.....VJfQq3v1G6: 500 | |
| a0f3572ce7... | 0.004 | 3.334 | User 2 (Suspected – Certainty 1) | 1Aga6VKG2txB.....Pb1QBK: 0.0656 | | | | |
| | | | Unknown | 1Q73YpvsLHK.....x8piM6: 17.5520 1Q73YpvsLHK.....x8piM6: 58.9057 | | | | |
| | | | User 2 (Verified) | 1CxANNosVhP.....PFbm: 0.0103731Q73 YpvsLHKyQo4.....piM6: 17.5739 1Q73YpvsLHK.....x8piM6: 27.9505 | | | | |
| | | | Unknown | 1Q73YpvsLHK.....x8piM6: 42.8260 1Q73YpvsLHK.....x8piM6: 18.2147 1Q73YpvsLHK.....x8piM6: 16.3231 | | | | |
| 4ce894e445... | 0 | 0.225 | User 3 (Suspected – Certainty 2) User 4 (Suspected – Certainty 2) | 1EC37GP7yUR.....6me71f7YCu: 2.45 | | User 4 (Verified) Uknown | 1G57XKKZN8Xhd68f.....LUKw5Dk: 0.6 13FWvrBkS7H1fnXh.....HM83ZQd: 1.85 | |
| 5bbc25c4ec... | 0 | 0.376 | User 5 (Verified) User 5 (Suspected – Certainty 4) | 19yK4LnWEkmw.....8ur1RiSiNJ: 25 18CiPFxEQK62Xq.....fSCfr2n85: 29 | | Unknown Unknown | 1KTDqWBuNss9NqV.....tJw7ch1: 10.6671 1HxZJGpszQ9qWoV.....rUxe4: 43.3329 | |
| a6e8e7d82a... | 0 | 0.191 | User 6 (Verified) | 1g54aBdf553Vvm.......HaeMB5S: 100 | | User 6 (Suspected – Certainty 4) | 1JUdTWU5uQ1fuGW.....ziYCFHz: 100 | |

FIGURE 11

| NAME | CURRENCY | PUBLIC KEY-ADDRESS | SUSPECTED CONTROL VALUE | BALANCE | LAST BLOCK | LAST TRANSACTION HASH | PRIVATE KEY |
|---|---|---|---|---|---|---|---|
| User 1 | Bitcoin | 1K2uv...616G2 | Verified | 3.867744 | 350432 | d8557...Ec512 | Unknown |
| User 2 | Bitcoin | 1KcCL...Bz5x4 | Verified | 0.050000 | 340003 | eaad7...7da200 | Unknown |
| User 2 | Bitcoin | 1gk1N...kLKUX | Provisional 4 | 0.055442 | 340003 | cee5a...91b8c | Unknown |
| User 2 | Bitcoin | 15cRt...9yi7d | Provisional 4 | 13.000000 | 299761 | 4a522...Ce22d4 | Unknown |
| User 2 | Litecoin | 1ENu...Xmgti | Provisional 2 | 6.783320 | 214514 | 9c6d0...2a405 | Unknown |
| User 2 | Bitcoin | 12xYo...Jwnfd | Provisional 5 | 1.000000 | 304568 | 024b9...48942 | Unknown |
| User 3 | Bitcoin | 15RLT...Y9RfM | Provisional 1 | 300.577400 | 214514 | d742a...5b2ee1 | 5H6HA...HQcLY |
| User 3 | Bitcoin | 12xYo...Jwnfd | Verified | 1.000000 | 9004 | 024b9...48942 | Unknown |
| User 4 | Dogecoin | 1NjVo...Boz1g | Provisional 1 | 4000.120000 | N/A | 94c3c...69331 | Unknown |
| User 4 | Unknown | 17DQ6...JJDyR | Provisional 1 | 0.000000 | N/A | N/A | Unknown |
| User 5 | Bitcoin | 1CjPR7...UM9BC | Provisional 4 | 25.074633 | 295758 | d1151...00aa0 | Unknown |

USER DIRECTORY DATA VIEW
1250

FIGURE 12

CRYPTOGRAPHIC CURRENCY USER DIRECTORY DATA AND ENHANCED PEER-VERIFICATION LEDGER SYNTHESIS THROUGH MULTI-MODAL CRYPTOGRAPHIC KEY-ADDRESS MAPPING

FIELD OF TECHNOLOGY

This disclosure relates generally to data processing devices and, more particularly, to cryptographic currency user directory data and enhanced peer-verification ledger synthesis through multi-modal cryptographic key-address mapping.

BACKGROUND

A cryptographic currency may be a peer-to-peer digital currency in which a user of the cryptographic currency may transfer a value from a public key-address under a control of the user to a different public key-address under a control of a different user through a transaction that is propagated across a cryptocurrency network. The user may have many unique instances of the public key-address, as the user may be able to generate a new public key-address at will with a key generation software. For example, the user may create the new public key-address for each transaction. To allow the peer-to-peer cryptographic currency to function without a central authority, the set of transactions may be recorded in a peer-verification ledger at a set of cryptographic nodes that comprise the cryptocurrency network. The peer-verification ledger may be a publically available data comprising an entire set of the previous transactions of the cryptographic currency to allow the cryptographic node to verify the transaction is valid (e.g., to verify that a value is currency associated with the public key-address that the transaction is purporting to transfer the value from). The peer-verification ledger, while including within the publically available data a set of transactions and an associated set of public key-addresses that the value has been transferred to and/or from, may not have any information regarding a true identity of who may control a particular public key-address (e.g., who may control the private key that may allow the value transfer from the corresponding public key-address). The cryptographic currency may therefore be "pseudonymous," that is, anonymous until the user discloses his or her control of the public key-address.

The cryptographic currency may be used by both a legitimate user and an illegitimate user. The illegitimate user may use the cryptographic currency to purchase contraband, support crime, and/or participate in terrorist activity. An analyst, who may be a law enforcement agency and/or an intelligence agency, may therefore be interested in monitoring or thwarting activity of a user of interest who is transacting in the cryptographic currency.

However, due to the pseudonymous nature of the cryptographic currency, the analyst may be unable to tell who sent and/or received the value of the cryptographic currency within a particular transaction. Criminals and/or terrorists, who may be synonymous with or comprise the user of interest, may continue to transact anonymously. Additionally, a thief of the cryptographic currency itself may use a hacking technique to obtain the private key of a legitimate user of the cryptographic currency and steal the value associated with the corresponding public key-address. Further, the user of interest may transact in several instances of the cryptographic currency, further complicating detection and surveillance efforts. The user of interest may therefore operate financially outside the control of a government authority that might otherwise be able to reduce crime and/or prevent terrorism by analyzing a set of global financial transactions.

SUMMARY

Disclosed are a method, a device and/or a system of cryptographic currency user directory data and enhanced peer-verification ledger synthesis through multi-modal cryptographic key-address mapping.

In one embodiment, a method for multimodal cryptographic key-address mapping includes using a computer processor and a volatile memory to determine that a propagation packet is a transaction of a cryptographic currency propagating across a network for integration into a peer-verification ledger. The transaction includes a value transfer of the cryptographic currency between an input key-address of an input of the transaction and an output key-address of an output of the transaction. The method also extracts an IP address from a TCP/IP layer of the propagation packet associated with the transaction, and additionally extracts from the transaction a transactional hash associated with the input of the transaction. The transactional hash references a previous output of a previous transaction.

Further, the method analyzes the peer-verification ledger to determine the input key-address associated with the transactional hash referencing the previous output. The input key-address of the input of the transaction of the cryptographic currency propagating across the network for integration into the peer-verification ledger is then extracted. Next, the IP address from the TCP/IP layer of the propagation packet is linked with the input key-address of the input of the transaction. The method also determines that the input key-address of the input of the transaction is under a suspected control of a user of interest based upon an association between the user of interest and the IP address extracted from the TCP/IP layer of the propagation packet of the transaction.

The method may further include stratifying, within a user directory data, a designation of the suspected control of the input key-address of the input of the transaction into one or more designations of a provisional control and a designation of a verified control. This designation may be based upon a predetermined certainty of the association between the user of interest and the IP address extracted from the TCP/IP layer of the propagation packet of the transaction.

The propagation packet may be determined to be the transaction of the cryptographic currency based upon the identification, within an application layer protocol of the propagation packet, of a magic number associated with a specific cryptographic currency and/or the magic number located in a header field of the application layer protocol. A byte size of the propagation packet and a hash format associated with the specific cryptographic currency may also be used to determine the presence of the propagation packet. The method may also determine that a point-to-point packet relayed between the user of interest and a correspondent of the user of interest is a key-bearing communication that includes a relayed key-address of the key-bearing communication. The key-bearing communication may be a chat note, a social media message, a text message, and/or a voice call. The relayed key-address of the key-bearing communication may be extracted from the key-bearing communication, and it may be determined that the user directory data includes the relayed key-address of the key-bearing communication.

When the user directory data does not include the relayed key-address of the key-bearing communication, the method may create a new entry for the relayed key-address within the user directory data. Similarly, it may be designated, within the user directory data, that the relayed key-address of the key-bearing communication is under the suspected control of the user of interest.

The method may also stratify, within the user directory data, the designation of the suspected control of the relayed key-address of the key-bearing communication into one or more designations of the provisional control and the designation of the verified control. The stratification may be based upon a predetermined certainty of the association between the user of interest and an IP address of the key-bearing communication extracted from the TCP/IP layer of the peer-to-peer packet and/or an online identity associated with a transmission of the key-bearing communication. The point-to-point packet may be identified as associated with the key-bearing communication based on a length of a character string of the relayed key-address of the key-bearing communication, a leading character of the character string of the relayed key-address of the key-bearing communication, and/or the character string of the relayed key-address of the key-bearing communication being a base-58 alpha-numeric format.

The method may also determine that a web content comprises a key-bearing content having an exhibited key-address of the key-bearing content. The key-bearing content may be a markup language page, a forum post, an online cryptographic key directory entry, and/or a social media data. Additionally, using a web-scraper, the exhibited key-address of the key-bearing content may be extracted from the key-bearing content. Following this process, and within the user directory data, the exhibited key-address of the key-bearing content may be designated as under the suspected control of the user of interest based upon an association between the online identity responsible for creating the key-bearing content and the user of interest.

The method may consolidate a set of key-addresses within a control radius of the verified control of the user of interest into a crypto bank profile corresponding to the user of interest, and additionally verify that the transaction has been incorporated into a forming unit of the peer-verification ledger and/or a confirmed unit of the peer-verification ledger. A majority of a set of prepopulated key-addresses within the user directory data may be derived from a set of previous transactions of the peer-verification ledger.

Also, when a first key-address of a specific stratum of the provisional control of the user of interest and a second key-address of an unknown control are both used as the input of the transaction, the method may designate, within the user directory data, the second key-address of the input of the transaction as under the specific stratum of the provisional control of the user of interest. Similarly, when a third key-address under a first stratum of provisional control of the user of interest and a fourth key-address under a second stratum of provisional control of the user of interest are both used as the input of the transaction, the method may elevate the designation of the third key-address and the designation of the fourth key-address to be under the verified control or a third stratum of provisional control closer in certainty to the verified control as measured by the control radius.

It may also be determined, when the transaction has a first key-address of the output of the transaction and a second key-address of the output of the transaction, that the first key-address of the output of the transaction is a change key-address returning a portion of the value transfer of the transaction back to the user of interest associated with the input key-address of the input of the transaction. The first key-address of the output of the transaction may be identified as the change key-address. This identification may occur by determining that the transfer of the value to the second key-address of the output of the transaction is an approximate integer multiple of a unit of the cryptographic currency. The identification may also occur by determining, when the second key-address of the output of the transaction is used as a next key-address of a new input of a later transaction, that traveling a distance between a geographic origin of the transaction and the later transaction would be physically impracticable for a suspected controller of both the second key-address of the output of the transaction and the next key-address of the new input of the later transaction within an elapse time of the transaction and the later transaction. The method may designate, within the user directory data, the change key-address as under the suspected control of the user of interest.

The method also applies to specific mechanisms of the cryptographic currency. For example, the peer-verification ledger may be a block chain data with the forming unit being a forming block of the block chain data and the confirmed unit being a confirmed block of the block chain data. The method also applies to specific types of the cryptographic currency. For example, the cryptographic currency may be a bitcoin currency, and the hash format may be a string of twenty-seven to thirty-four base-58 alphanumeric characters beginning with a numeral "1" or a numeral "3".

In another embodiment, a method includes determining that a propagation packet is a transaction of a cryptographic currency propagating across a network for integration into a peer-verification ledger, the transaction including a value transfer of the cryptographic currency between an input key-address of an input of the transaction and an output key-address of an output of the transaction. Next, an IP address from a TCP/IP layer of the propagation packet associated with the transaction is extracted. Similarly extracted from the transaction is a transactional hash associated with the input of the transaction. The transactional hash referencing a previous output of a previous transaction.

The peer-verification ledger is then analyzed to determine the input key-address associated with the transactional hash referencing the previous output. The input key-address of the input of the transaction of the cryptographic currency propagating across the network for integration into the peer-verification ledger is then extracted, allowing for the linking of the IP address from the TCP/IP layer of the propagation packet with the input key-address of the input of the transaction. Within an enhanced ledger data it is then designated that the input key-address of the input of the transaction is under a suspected control of a user of interest, based upon an association between the user of interest and the IP address extracted from the TCP/IP layer of the propagation packet of the transaction.

In yet another embodiment, a system includes a collection server associated with an access point and having a computer processor and physical memory. The collection server intercepts an internet protocol packet determined by the collection server to have an association with a transaction of a cryptographic currency propagating across a network for integration into a peer-verification ledger and/or a key-bearing communication between a user of interest and a correspondent of the user of interest.

The system also includes an IP extraction module to extract an IP address from a TCP/IP layer of the propagation packet associated with the transaction and/or the key-bearing communication. A key extraction module extracts a transactional hash of an input of the transaction of the cryptographic currency propagating across the network for integration into the peer-verification ledger and/or extracts a relayed key-address of the key-bearing communication between the user of interest and the correspondent of the user of interest. Finally, the system includes a network, a cryptocurrency network, and a directory server that houses a ledger copy data, a user directory data, and/or an enhanced ledger data.

BRIEF DESCRIPTION OF THE DRAWINGS

The embodiments of this invention are illustrated by way of example and not limitation in the figures of the accompanying drawings, in which like references indicate similar elements and in which:

FIG. 4 is a cryptocurrency transaction specification and raw data interception view 450 showing a protocol specification for the transaction of FIG. 3, the specification illustrating a field size of a set of fields such that may allow the collection server of FIG. 1 to assess a raw data of the transaction in order to determine the input key-address and associate the input key-address with the IP address of the TCP/IP layer of the propagation packet for addition to the user directory data and/or enhanced ledger data, according to one or more embodiments.

FIG. 10 is an enhanced peer-verification ledger summary view that shows a summary of a set of blocks associated with a peer-verification ledger that is specifically a block chain of a Bitcoin cryptographic currency, the summary annotated with both a set of users of interest appearing within a particular block of the block chain and a set of alerts associated with activity of one or more of the set of the users of interest, according to one or more embodiments.

FIG. 11 is an enhanced ledger data individual block view showing a specific instance of an enhanced block embodied within the enhanced ledger data of FIG. 10, the enhanced block comprising a set of the transactions of FIG. 3 and modified to include the input key-address, the name of the user of interest associated with the input key-address, and the name of a different user of interest associated with the output key-address, according to one or more embodiments.

FIG. 12 is a user directory data view showing the user directory data of FIG. 1 comprising a set of public key-addresses that are under the suspected control a set of users of interest, the set of public key-addresses spanning several types of the cryptographic currency and each public key-address having the suspected control stratified into a verified control state and a set of provisional control states, the verified control state and the set of provisional control states corresponding to a certainty that the public key-address is associated with the particular user of interest, according to one or more embodiments.

Other features of the present embodiments will be apparent from the accompanying drawings and from the detailed description that follows.

DETAILED DESCRIPTION

Disclosed are a method, a device and a system of cryptographic currency user directory data and enhanced peer-verification ledger synthesis through multi-modal cryptographic key-address mapping. Although the present embodiments have been described with reference to specific example embodiments, it will be evident that various modifications and changes may be made to these embodiments without departing from the broader spirit and scope of the various embodiments.

Figure 1:
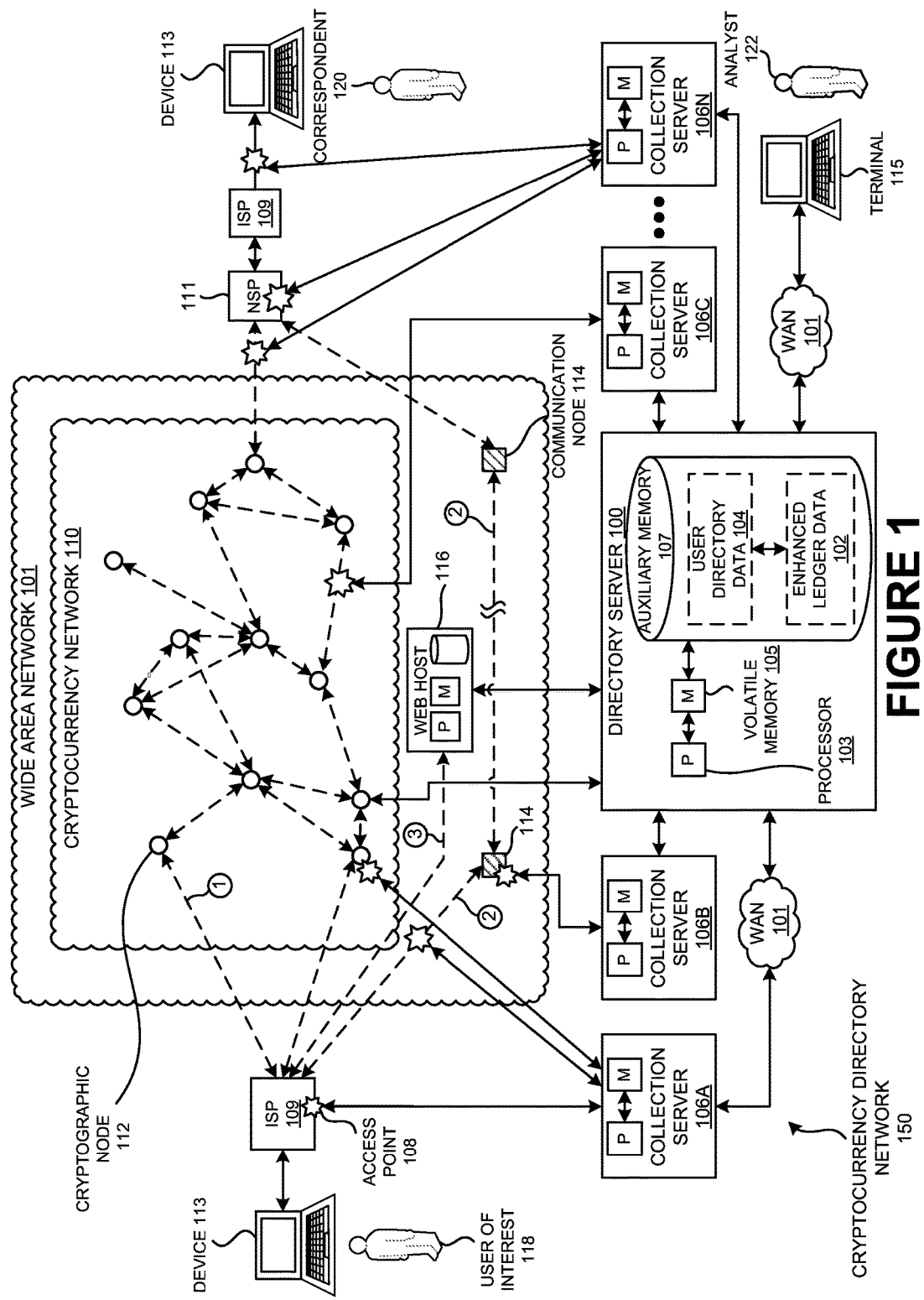
FIG. 1 is a cryptocurrency directory network that shows a directory server synthesizing both a user directory data and an enhanced ledger data comprising information about an identity of a set of users of a cryptographic currency, the directory server utilizing a set of collection servers to intercept data at one or more access points of a wide area network, the intercepted data including a transaction of the cryptographic currency propagating across the cryptocurrency network, a key-bearing communication between a user of interest and a correspondent made through a communication node, and a key-bearing content of the user of interest exposed on a website of a web host, according to one or more embodiments.

FIG. 1 is a cryptocurrency directory network 150 that shows a directory server synthesizing both a user directory data and an enhanced ledger data comprising information about an identity of a set of users of a cryptographic currency, the directory server utilizing a set of collection servers to intercept data at one or more access points of a wide area network, the intercepted data including a transaction of the cryptographic currency propagating across the cryptocurrency network, a key-bearing communication between a user of interest and a correspondent made through a communication node, and a key-bearing content of the user of interest exposed on a website of a web host, according to one or more embodiments. Particularly, FIG. 1 illustrates a directory server 100, a wide area network 101 (which may also be referred to as "a network"), an enhanced ledger data 102, a processor 103, a user directory data 104, a volatile memory 105 (which may also be referred to as a "physical memory"), a set of collection servers 106A through 106N, an auxiliary memory 107, an access point 108, an internet service provider 109 (which may also be referred to as the ISP 109), a cryptocurrency network 110, a network service provider 111 (which may also be referred to as the NSP 111), a cryptographic node 112, a device 113, a communication node 114, a terminal 115, a web host 116, a user of interest 118, a correspondent 120, and an analyst 122.

In FIG. 1, the directory server 100 may monitor various portions of the wide area network 101, using the set of collection servers 106A through 106N, to identify and recover information relating to the cryptographic currency that uses the cryptocurrency network 110. The directory server 100 uses the processor 103, the volatile memory 105, and the auxiliary memory 107 to identify, recover, analyze and store the information related to the cryptographic currency. One of the set of collection servers 106 (e.g., the collection server 106A) may search for the information relating to the cryptographic currency moving across the wide area network 101 by probing an access point 108. The access point 108 may be associated with a number of network elements such as the internet service provider 109, the network service provider 111, the cryptographic node 112, the communication node 114, and/or multiple locations between the network elements. For example, the access point 108 may also be located at a routing server of the wide area network 101 and/or a backbone transport between the internet service provider 109 and the device 113 of the user of interest 118. The wide area network 101 may be an internet protocol network. The device 113 may be a computing device such as a personal computer, a mobile device, and/or a tablet device. The device 113 may also be a server with an automated transactional process. The directory server 100 may gather, through a multi-modal information process, the information relating to the cryptographic currency from at least one of three or more primary sources.

Figure 3:
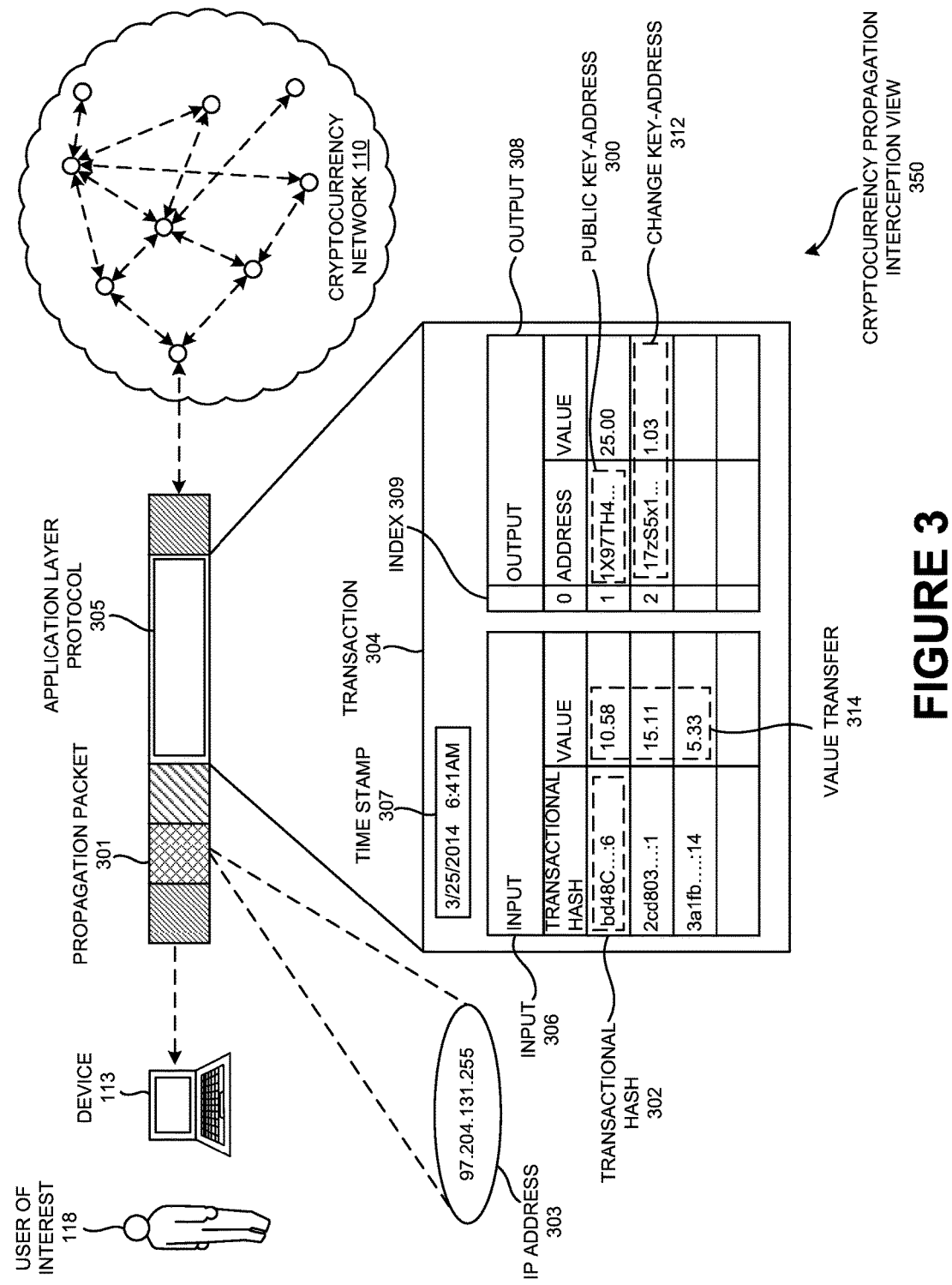
FIG. 3 is a cryptocurrency propagation interception view 350 that shows a propagation packet of the transaction that has been intercepted by the collection server of FIG. 1, the propagation packet having an associated IP address of the user of interest and the transaction comprising a value transfer of the cryptographic currency to an output key-address from an input key-address associated with a transactional hash of the transaction, according to one or more embodiments.

In a first mode of cryptographic key-address mapping, the directory server 100 may probe for and collect the propagation packet (which may be an internet protocol packet, e.g., the propagation packet 301 of FIG. 3) carrying the transaction of the cryptographic currency across the wide area network 101. The transaction may have a key-address of the cryptographic currency. Specifically, the key-address may be a string of characters generated by a hashing function and having an associated private key, a controller of the private key being able to transfer a value of the cryptographic currency associated with the key-address to another key-address. The key-address may also be referred to as a "public key-address" (e.g., the public key-address 300). The public key-address may take on several roles within the cryptographic currency depending on the context in which it is used. For example, the same public key-address may be the input of one transaction (e.g., the input 306 of FIG. 3, in which case a value is being transferred from the public key-address) and an output of another transaction (e.g., the output 308 of FIG. 3, in which case a value is being transferred to the public key-address). The public key-address may also be communicated between users of the cryptographic currency so that one user knows an appropriate key-address to send value to (e.g., the relayed key-address 600 of FIG. 6 and/or the exhibited key-address 800 of FIG. 8). The public key-address may also be used to return a portion of the value of the transfer of a transaction back to a user of the cryptographic currency (e.g., the change key-address 312 of FIG. 3).

The propagation of the transaction to the cryptocurrency network 110, as initiated by the user of interest 118, is seen in 'circle 1' of FIG. 1. In this way, the directory server 100 may be intercepting the transaction substantially simultaneously and in a substantially real time as the transaction is propagated across the cryptocurrency network 110. In one preferred embodiment, the access point 108 is near an edge of the cryptocurrency network 110 (which may, also, be on the edge of the wide area network 101) as some instances of the cryptographic currency strip an internet protocol address (e.g., the IP address 303 of FIG. 3) associated with an initiator of the transaction (who may be the user of interest 118) from the internet protocol packet as the internet protocol packet propagates through the cryptocurrency network. The edge of the cryptocurrency network may be, for example, at the internet service provider 109. The transaction includes data that allows the directory server 100 to associate an input key-address of the transaction with the transaction due to the public nature of the cryptocurrency network 110, as described in conjunction with FIG. 3, FIG. 4 and FIG. 5.

A second primary mode of cryptographic key-address mapping may be the addition to the enhanced ledger data 102 and/or the user directory data 104 of information derived from intercepted communications and/or transactions between the user of interest 118 and the correspondent 120 of the user of interest 118. The collection server 106, with its access point 108 located at the communication node 114 of the wide area network 101, may be able to identify a communication having a public key-address and/or a private key (e.g., the key-bearing communication 606 of FIG. 6) based upon a signature of the key-address within the communication, as described in conjunction with FIG. 6. In FIG. 1, the communication is seen moving along path 'circle 2' from the user of interest 118 through at least two of the communication nodes 114 of the wide area network 101 to the correspondent 120. The key-bearing communication 606 may be an email, a text message, or a chat message to the correspondent, a content of which includes a public key-address of the cryptographic currency under a control of the user of interest 118 in order for the correspondent 120 to transfer a value of the cryptographic currency from the public key-address under the control of the correspondent. To have control of the public key may mean to have the ability to initiate the transaction of a transfer of value associated with the public key-address to a different public key-address. Specifically, the user of interest 118 may have control of the public key when the user of interest 118 knows or has access to the private key matching the public key-address, the private key enabling the user of interest 118 to sign the transaction to effectuate the transfer of value from the public key-address (e.g., the input key-address) to an output key-address (e.g., the public key-address 300 of the output 308 of the transaction). The user of interest 118 may transfer the value of the public key-address to a different user of interest either by initiating the transaction to send the value associated with the public key-address to a different key-address or by simply conveying the private key matching the public key-address to the different user (although this later form of value conveyance may be rare due to the ease of creating the transaction to be broadcast to the cryptocurrency network 110).

Another source of cryptographic key-address mapping used to populate the enhanced ledger data 102 and/or the user directory data 104 may include information that the user of interest 118 may make available on a public forum, a web page, and/or a markup-language page hosted on the web host 116. In FIG. 1, the user of interest 118 is seen posting the information along path 'circle 3,' to the web host 116. In a specific example, an organizational instance of the user of interest 118 may accept the cryptographic currency as a form of payment, and may therefore place an instance of the public key-address on a website affiliated with the organization to allow easy payment and/or donation to the organization by a set of users of the cryptographic currency.

The cryptographic currency may be a medium of exchange designed to securely exchange information through a public, peer-to-peer transaction verification process enabled by certain principles of cryptography. The cryptographic currency may also be a type of digital currency that is based on cryptography to ensure security, making the cryptographic currency difficult to counterfeit. The cryptographic currency may be a medium of exchange using public and private keys to transfer the value of the currency from one person to another. The cryptographic currency may also be referred to as a crypto-currency, a cyber currency, a digital cash, a digital currency, a digital money, an e-currency, an e-money, an electronic cash, an electronic currency, and an electronic money. A specific instance of the cryptographic currency is Bitcoin (which may be denoted BTC), which launched in 2009. Other specific examples of the cryptographic currency include Litecoin (LTC), Namecoin (NMC), Dogecoin (Doge) and Masertercoin (MSC).

The cryptocurrency network 110 may be a network of peer-to-peer nodes (e.g., the cryptographic node 112) that process the transaction of the value transfer of the cryptographic currency from a first public key-address (e.g., the input key-address of the transaction) to a second public key-address (e.g., the output key-address of the transaction). The transaction is broadcast to the cryptocurrency network 110 and included in a peer-verification ledger, a copy of which may be located at or associated with the cryptographic node 112. A person and/or an organization associated with the cryptographic node may participate in the cryptocurrency network 110—specifically, by keeping a public copy of a peer-verification ledger that records the set of transaction—because a software code implementing the cryptocurrency network 110 may reward the person and/or the organization for doing so. This reward may take the form of randomly awarding a predetermined value of the cryptographic currency, a probability of receiving the reward proportionate upon a total computational power contributed to processing the set of transactions of the cryptocurrency network 110. Dedicating or contributing a computing power to the cryptocurrency network 110 in an effort to receive the reward may be referred to as "mining" the cryptographic currency. A distributed nature of the peer-verification ledger may ensure that the value of the cryptographic currency associated with a particular public key-address cannot be spent twice. Each user of the cryptocurrency network may potentially have many instances of the public key-address. Although one form of the cryptographic currency has been described, the user directory data 104 and/or the enhanced ledger data may be comprised of additional instances of the cryptographic currency that use a public key-address with a corresponding private key, even where the additional instance of the cryptographic currency uses a different reward structure and/or a different peer-verification process.

The cryptocurrency network 110 may be comprised of the cryptographic nodes 112 to publically verify a set of transactions of users of the cryptographic currency. The cryptographic node 112 may be a node that participates in the cryptocurrency network 110 by relaying the transaction, maintaining the peer-verification ledger, and/or "mining" for the cryptographic currency (e.g., attempting to receive the reward by participating in the maintenance of the cryptocurrency network 110).

The access point 108 may be a location at which the collection server 106A may be communicatively coupled to a backbone transport of the wide area network 101 to replicate and analyze information and/or traffic over the backbone transport. The access point 108 may also be any other location that may allow for an interception of information and/or an interception of data across the wide area network 101. One or more of the set of collection servers 106 through 106N may be associated with the access point and communicatively coupled with the directory server 100. The set of collection servers 106A through 106N may be responsible for identifying which of a set of information moving past the access point 108 associated with a particular collection server 106 should be analyzed and/or conveyed to the directory server 100.

The ISP 109 may be an organization that provides services for accessing, using, or participating in the Internet and/or other communications and transactions over the wide area network 101. The ISP 109 may be an organization that is commercial, community-owned, non-profit, or otherwise privately owned. The user of interest 118 may refer to a specific person and/or a group of people such as an organization. For example, a non-profit organization may be a user of interest, as might be a government, a business, or a terrorist organization. In some cases, the user of interest 118 may only refer to an online identity, as a controller of the online identity (e.g., the natural person and/or organization that controls the use of the online identity) may be unknown. In one or more embodiments, each and every user of the cryptographic currency may be the user of interest 118. The correspondent 120 of the user of interest 118 may also be a specific person and/or a group of people such as an organization, or may be an online identity when no additional information of the correspondent is known. Similarly, the analyst 122 may represent a natural person and/or an organization. For example, analyst 122 may be a government law enforcement agency, a security agency, a non-profit corporation or educational institution, and/or an agent or employee of any of these organizations. The analyst 122 may use the enhanced ledger data 102 and/or the user directory data 104 to improve an integrity of the cryptocurrency network 110 (e.g., by catching a cryptocurrency thief), study a behavioral pattern of a use of the cryptographic currency (e.g., economics), or to gather an information related to criminal activity and/or collect intelligence (for example, to thwart a terrorist activity).

Figure 2:
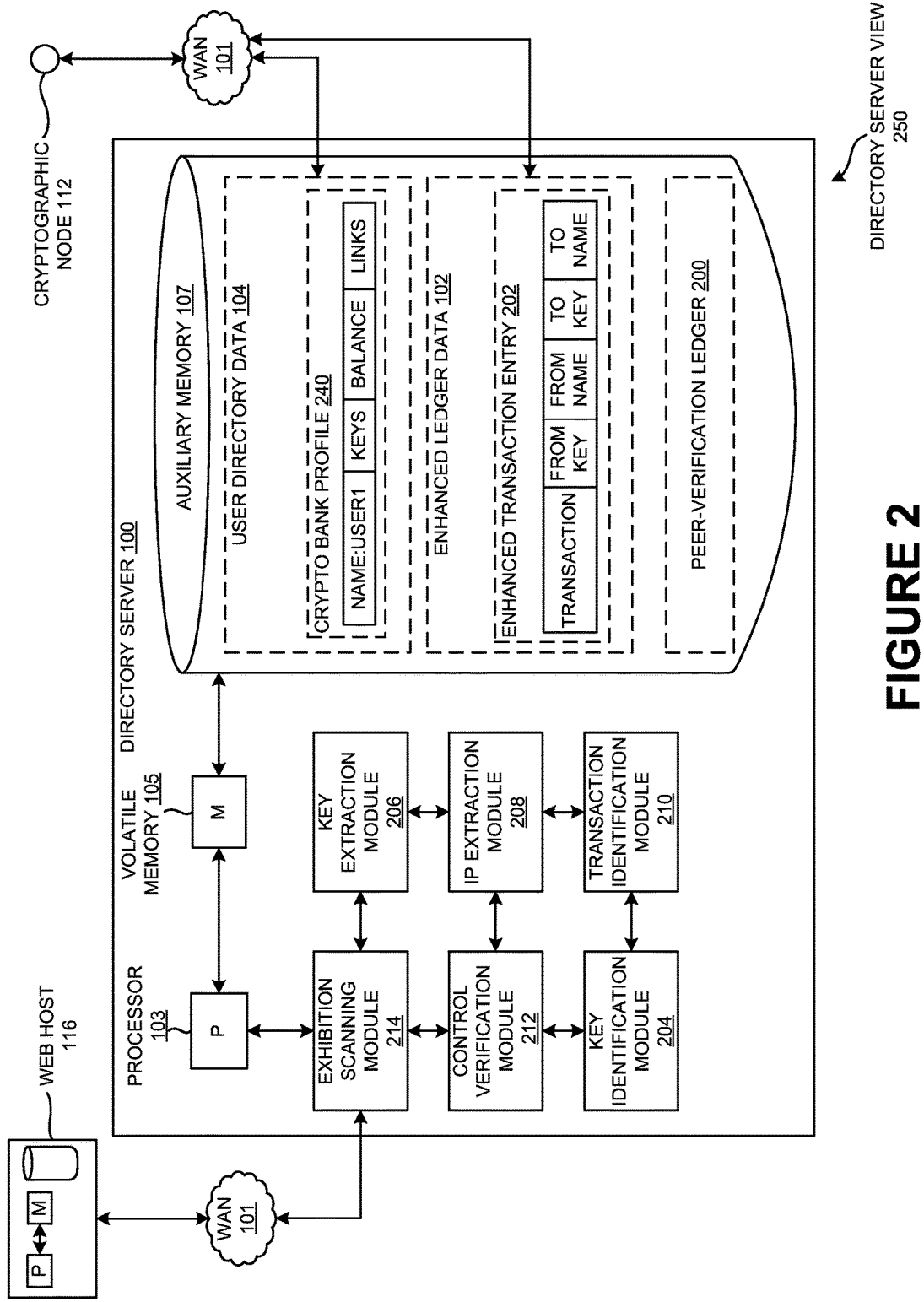
FIG. 2 is a directory server view showing the directory server of FIG. 1 having a processor, a volatile memory, and an auxiliary memory that includes the directory data and the enhanced ledger data, the directory server also comprising a peer-verification ledger of the cryptographic currency and a number of modules including a key extraction module, a control verification module, and an IP extraction module, according to one or more embodiments.

FIG. 2 is a directory server view 250 showing the directory server of FIG. 1 having a processor, a volatile memory, and an auxiliary memory that includes the directory data the enhanced ledger data, the directory server also comprising a peer-verification ledger of the cryptographic currency and a number of modules including a key extraction module, a control verification module, and an IP extraction module, according to one or more embodiments. Particularly, FIG. 2 further illustrates a peer-verification ledger 200, an enhanced transaction entry 202, a key identification module 204, a key extraction module 206, an IP extraction module 208, a transaction identification module 210, a control verification module 212, an exhibition scanning module 214, and a crypto bank profile 240.

The auxiliary memory 107 may include the peer-verification ledger 200 that may be referenced in forming the enhanced ledger data 102 and/or the user directory data 104 as described in conjunction with FIG. 10 through FIG. 12. In one embodiment, the directory server 100 is one of the cryptographic nodes 112 of the cryptocurrency network 110 and, consequentially, includes the peer-verification ledger 200. In an alternate embodiment, the directory server 100 may include a ledger copy data that is a copy of the peer-verification ledger, at a static point in time or as updated in substantially real time. Where the directory server 100 is not part of the cryptocurrency network 110, the directory server 100 may reference the cryptographic node 112 of the cryptocurrency network 110 for an updated information as may be useful to populate the enhanced ledger data 102 and/or the user directory data 104.

The enhanced ledger data 102 may include an enhanced transaction entry 202 that may be a form of the transaction as incorporated into the peer-verification ledger but with added information such as a name of the user of interest 118 (and/or their IP address) associated with the input key-address and/or the output key-address of the transaction. The user directory data 104 may include a crypto bank profile 240 of the user of interest that organizes the set of public key-addresses of one or more cryptographic currencies believed to be under the suspected control of the user of interest.

The transaction identification module 210 may identify the propagation packet as being a transaction of the cryptographic currency as described in conjunction with FIG. 4. The key identification module 204 may identify the communication between the user of interest 118 and the correspondent 120 as being the key-bearing communication based on a format of the public key-address and/or private key within communication, as described in conjunction with FIG. 5. Similarly, the exhibition scanning module 214 may identify the key-bearing content located in association with the web host 116, as described in conjunction with FIG. 8. The IP extraction module 208 may extract the IP address (e.g., the IP address 303 of FIG. 3 and FIG. 6 from the internet protocol packet). The key-extraction module 206 may extract (e.g., separate and store) the public key-address and/or the private key identified by the key extraction module 206. The key-extraction module 206 may also extract the output key-address of the propagating packet and/or the input key-address associated with the transaction. The control verification module 212 may assign a level of certainty to the association between the public key-address and the user of interest 118 believed to control the public key-address, as described in conjunction with FIG. 11. In one preferred embodiment, the IP extraction module 208, the transaction identification module 210, and the key identification module 204 may additionally be situated at the collection servers 106A through 106N.

FIG. 3 is a cryptocurrency propagation interception view 350 that shows a propagation packet of the transaction that has been intercepted by the collection server of FIG. 1, the propagation packet having an associated IP address of the user of interest and the transaction comprising a value transfer of the cryptographic currency to an output key-address from an input key-address associated with a transactional hash of the transaction, according to one or more embodiments. Particularly, FIG. 3 further illustrates a public key-address 300, a propagation packet 301, a transactional hash 302, an IP address 303 of the TCP/IP layer of the propagation packet, a transaction 304, an application layer protocol 305, an input 306, an output 308, an index 309, a change key-address 312, and a value transfer 314.

In FIG. 3, the user of interest 118 initiates the propagation of the transaction 304 to the cryptocurrency network 110 on the device 113. The device 113 may be a mobile device, a personal computer, a tablet, a server, and/or any other computing device. A content of the transaction is carried in the application layer protocol 305 of the propagation packet 301. The propagation packet 301 may include within a TCP/IP layer the IP address 303 associated with of the user of interest 118. Once reaching the cryptocurrency network 110, the IP address 303 of the user of interest 118 may be lost, which may require interception of the propagation packet 301 by the collection server 106 at an edge of the cryptocurrency network 110.

The transaction 304 is comprised of an input 306 of one or more instances of a public key-addresses 300. In FIG. 3, the input key-addresses are not immediately evident being that the input key-addresses of the transaction 304 are indirectly referenced by the transactional hash 302, the reference being made to the peer-verification ledger where the input key-addresses may reside as the output key-address of a previous transaction. The transaction 304 is also comprised of an output 308 of one or more instances of the public key-address 300. The transaction 304 accomplishes the value transfer 314 from a total value of the input key-addresses referenced by the transactional hash 302 to the output key-address (e.g., the public key-address 300 of the output 308 of the transaction 304). The output may have the index 309 that may allow a future transactional hash 302 of a later transaction to reference the output of the transaction 304 as a new input of the later transaction. The transaction may also include a time stamp 307, in one or more embodiments, that may be appended to the transaction 304 by the device 113 and/or the cryptographic node 112 of the cryptocurrency network 110.

The one or more instances of the input key-addresses referenced by the transactional hash 302 may be under the control of the user of interest 118 when the directory server 100 includes a known association between the IP address 303 and the user of interest 118. For example, the directory server 100 may have a recorded information that the user of interest 118 may subscribe to a particular instance of the ISP 109 with a limited number of dynamically assigned instances of the IP address 303. A propagation packet 301 that has the IP address 303 within the limited number of dynamically assigned instances of the IP address 303 may therefore be indicative of having been propagated by the user of interest 118.

The transaction 304 may also include a public key-address 300 of the output 308 that is under the control of the user of interest 118. For example, due to the design of the cryptographic currency that utilizes the peer-verification ledger, the change key-address 312 may be required to return a portion of the input 306 of the transaction 304 back to the user of interest 118 to avoid overpayment. It is sometimes impossible to recognize the change key-address within the output 308. However, as people often think in integers, it may be possible to determine the change key-address 312 as a public key-address 300 of the output 308 that did not receive an integer value portion of the value transfer 314.

FIG. 4 is a cryptocurrency transaction specification and raw data interception view 450 showing a protocol specification for the transaction of FIG. 3, the specification illustrating a field size of a set of fields such that may allow the collection server of FIG. 1 to assess a raw data of the transaction in order to determine the input-key address and associate the input key-address with the IP address of the TCP/IP layer of the propagation packet for addition to the user directory data and/or enhanced ledger data, according to one or more embodiments.

FIG. 4 shows an example of the protocol specification 400 of the transaction 304 of the cryptographic currency. The field size, which may be in bytes, may be important for the set of collection servers 106A through 106N to identify the propagation packet 301. Specifically, the transaction identification module 210 may search for an internet protocol packet that includes a set of data indicative of being a public key-address 300 of the output 308 of the transaction. For example, the transaction identification module 210 may use the field size of the protocol specification 400 to identify the appropriate location at which to check the raw transaction data 404 for the public key-address 300 of the output 308. Identification within the location specified in the protocol specification 400 as being indicative of the public key-address 300 may verify that the internet protocol packet is in fact the propagation packet 301 comprising the transaction 304. In FIG. 4, the raw transaction data 404 is shown in a hexadecimal format. Many instances of the cryptographic currency use base-58 alphanumeric public key-addresses. Therefore, the transaction identification module 210 may convert the hexadecimal data at the location specified in the protocol specification 400 to a base 58-alphanumeric string, verifying that the resulting data may conform to an accepted format for the public key-address 300 of the particular instance of the cryptographic currency corresponding to the protocol specification 400. Other indicators may include the starting character of the converted base-58 alphanumeric string (for example, a Bitcoin public key-address may begin with a character '1' and Bitcoin private keys may begin with a character '5'). In one preferred embodiment, the transaction identification module 210 may search for multiple instances of the cryptographic currency (e.g., Bitcoin, Dogecoin) simultaneously based upon a protocol specification 400 for each.

The transaction identification module 210 may also identify the propagation packet based upon a magic number value within a field header of the application layer of the propagation packet. The magic number value may indicate an origin of a message on a network. For example the magic number value may be the first four bytes of the protocol specification 400. In one or more alternate embodiments, the magic number value may be a version field (e.g., having the raw transaction data 404 of '01 00 00 00' in FIG. 4. The transaction identification module 210 may also be able to identify the transaction based upon a set number of sizes of the internet protocol packet as determined by the protocol specification 400. Specifically, while a particular size of a particular instance of the transaction 304 may vary, only a certain set of sizes may be permissible based upon a fixed and a variable portion of the protocol specification 400.

Figure 5:
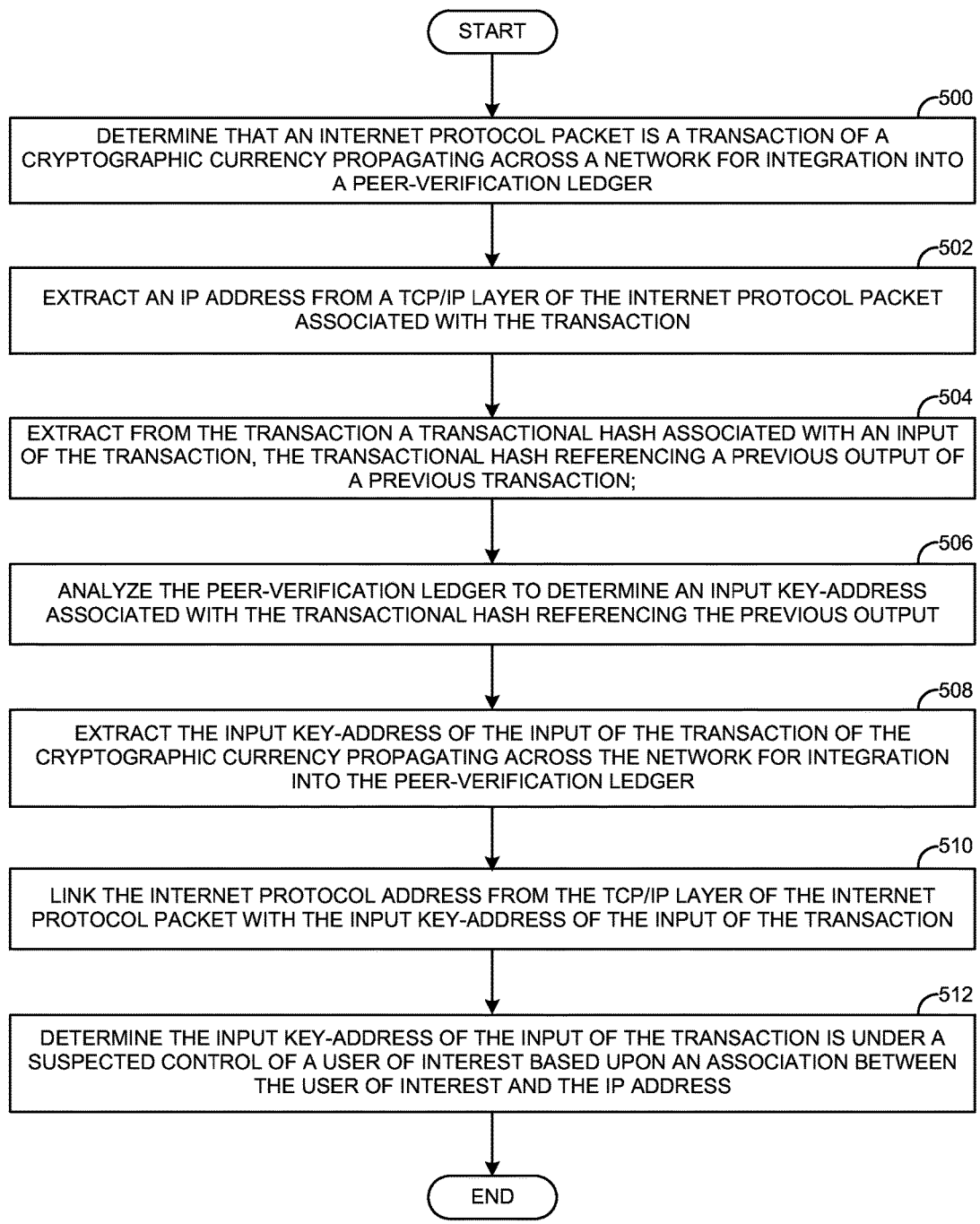
FIG. 5 is a process flow showing a set of operations that may be used to determine that the input key-address of the transaction analyzed in FIG. 4 is under a suspected control of a user of interest by associating the user of interest with the IP address extracted from the TCP/IP layer of the propagation packet, the suspected control of the user to be added to and maintained within the user directory data and/or the enhanced ledger data, according to one or more embodiments.

FIG. 5 is a process flow showing a set of operations that may be used to determine that the input key-address of the transaction analyzed in FIG. 4 is under a suspected control of a user of interest by associating the user of interest with the IP address extracted from the TCP/IP layer of the propagation packet, the suspected control of the user to be added to and maintained within the user directory data and/or the enhanced ledger data, according to one or more embodiments. Operation 500 may determine that an internet protocol packet is a transaction of a cryptographic currency propagating across a network for integration into a peer-verification ledger (the internet protocol packet conveying the transaction 304 may be referred to as the propagation packet 301). Operation 502 may extract an IP address from a TCP/IP layer of the internet protocol packet associated with the transaction. Operation 504 may extract from the transaction a transactional hash associated with an input of the transaction, the transactional hash referencing a previous output of a previous transaction. Operation 506, which may be conducted by the key extraction module 206, may analyze the peer-verification ledger to determine an input key-address associated with the transactional hash referencing the previous output. For example, in the context of FIG. 3, each transactional hash 302 of the input 306 refers to a specific former transaction (in FIG. 3, the specific former transaction may be referred to by the transactional hash 302 beginning "bd48C") along with an index (e.g., the index 309 of the specific former transaction, appearing in FIG. 3 after the transactional hash 302 as ":6").

Operation 508 may extract the input key-address of the input of the transaction, for example by extracting the input key-address from the peer-verification ledger. In some instances of the cryptographic currency, however, the input key-address may be extracted directly from propagation packet 301. Operation 510 may link the internet protocol address (e.g., IP address 303) from the TCP/IP layer of the internet protocol packet with the input key-address of the input of the transaction. Operation 512 may determine that the input key-address of the input of the transaction 304 is under a suspected control of a user of interest based upon an association between the user of interest and the IP address. Operation 512, for example, may be conducted by the control verification module 212.

Figure 6:
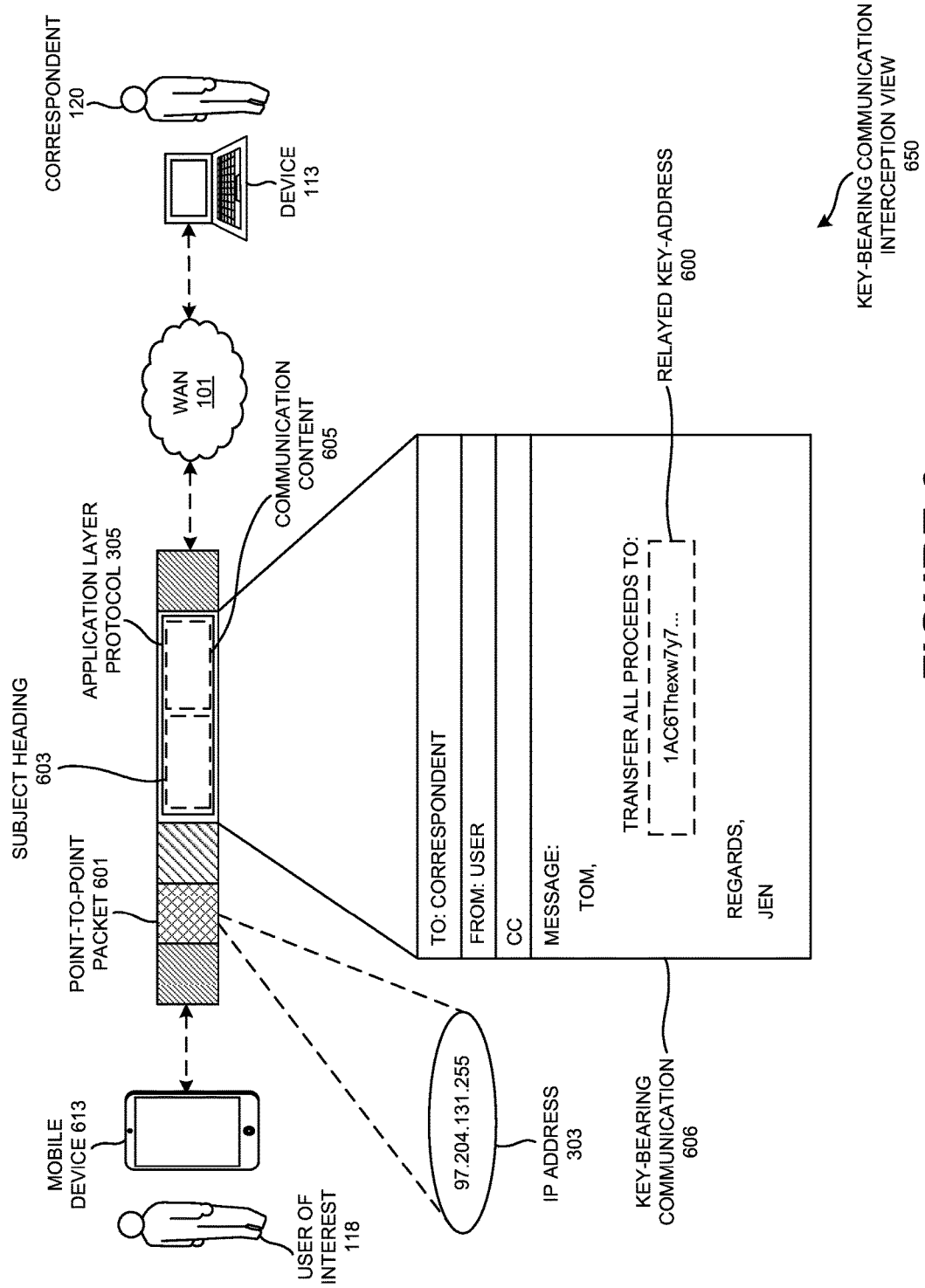
FIG. 6 is a key-bearing communication interception view that shows a point-to-point packet of a key-bearing communication comprising a relayed key-address, the point-to-point packet intercepted by the collection server of FIG. 1 while in transit between the user of interest and a correspondent and having an associated IP address of the user of interest, according to one or more embodiments.

FIG. 6 is a key-bearing communication interception view 650 that shows a point-to-point packet of a key-bearing communication comprising a relayed key-address, the pointto-point packet intercepted by the collection server of FIG. 1 while in transit between the user of interest and a correspondent and having an associated IP address of the user of interest, according to one or more embodiments. Particularly, FIG. 6 further illustrates a relayed key-address 600, point-to-point packet 601, a subject heading 603, a communication content 605, a key-bearing communication 606, and a mobile device 613.

In FIG. 6, the user of interest 118 uses the mobile device 613 to send an email to the correspondent 120, the email relayed as the internet protocol packet. The email is encapsulated in a communication content 605 of the internet protocol packet which the collection server 106 may analyze to determine that the internet protocol packet is the point-to-point packet 601 containing the key-bearing communication 606 comprising the relayed key-address 600. The relayed key-address 600 may be an instance of the public key-address of the cryptographic currency that may be under the control of the user of interest 118. Specifically, the collection server 106 may analyze the subject heading 603 portion of the application layer protocol 305 and/or the communication content 605 of the application layer of the internet protocol packet to determine if the internet protocol packet is the point-to-point packet. The relayed key-address 600 may be identified by being a common key-address format (also referred to as a "hash format"). In one embodiment, the relayed key-address 600 is identified by being a string of twenty-seven to thirty-four base-58 alphanumeric characters. The particular instance of the cryptographic currency to which the relayed key-address 600 may belong may be identified by analyzing the beginning character of the string. For example, either a numeral "1" and or numeral "3" may stand for the public key-address of the Bitcoin cryptographic currency. In another example, a private key of the Bitcoin cryptographic currency may begin with a character "5." The particular instance of the cryptographic currency corresponding the relayed key-address 600 may also be detected by referencing the peer-verification ledger of several instances of the cryptographic currency for a previous use of the relayed key-address 600. The point-to-point packet 601 may have the IP address 303 of the user of interest 118, even when moving past the edge of the wide area network 101. The point-to-point packet 601 may additionally include a second IP address of the correspondent 120 that may also be of interest to the directory server 100.

The key-bearing communication 606, in addition to the email, may be a text message, an SMS message, an internet chat message, and/or a social media message. The key-bearing communication 606 may also be any other form of an electronic communication that comprises a set of characters and is sent from one point to another over the wide area network 101. The key-bearing communication 606 may additionally be a voice call, which the collection server 106 may translate into text (e.g., VoIP). Although FIG. 1 does not explicitly show a cellular phone network, the key-bearing communication 606 may also be a voice telephone call over the cellular phone network.

Figure 7:
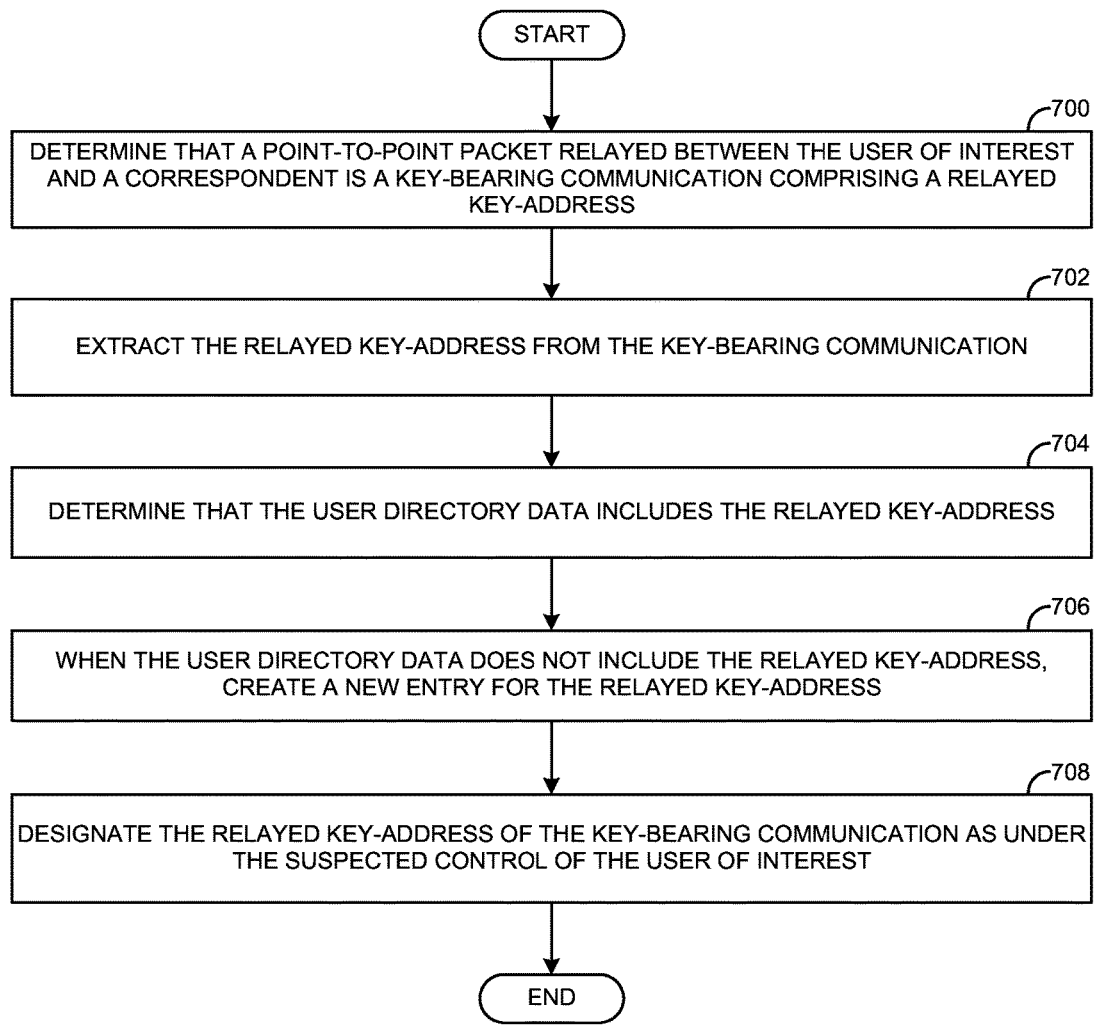
FIG. 7 is a process flow showing a set of operations that may be used to determine that the relayed key-address of the key-bearing communication of FIG. 6 is under the suspected control of the user of interest by associating the user of interest with the IP address extracted from the TCP/IP layer of the point-to-point packet, the suspected control of the user of interest to be added to and maintained within the user directory data and/or the enhanced ledger data, according to one or more embodiments.

FIG. 7 is a process flow showing a set of operations that may be used to determine that the relayed key-address of the key-bearing communication of FIG. 6 is under the suspected control of the user of interest by associating the user of interest with the IP address extracted from the TCP/IP layer of the point-to-point packet, the suspected control of the user of interest to be added to and maintained within the user directory data and/or the enhanced ledger data, according to one or more embodiments. Operation 700 may determine that a point-to-point packet relayed between the user of interest and a correspondent is a key-bearing communication comprising a relayed key-address. Operation 702 may extract the relayed key-address from the key-bearing communication. Operation 704 may determine that the user directory data includes the relayed key-address. Additionally, it may be determined that the peer-verification ledger includes the relayed key-address to verify the particular cryptographic currency to which the relayed key-address belongs and/or determine if the relayed key-address has not yet been used in an instance of the transaction. When the user directory data does not include the relayed key-address, Operation 706 may create a new entry for the relayed key-address within the user directory data. Finally, operation 708 may designate the relayed key-address of the key-bearing communication as under the suspected control of the user of interest. The designation of the suspected control may be given a value depending on a believed strength of the association between the user of interest 118 and the IP address 303 of the point-to-point packet 601. In addition, the association may be adjusted based upon a destination IP address of the point-to-point packet 601 (e.g., the destination IP address of the correspondent 120).

Figure 8:
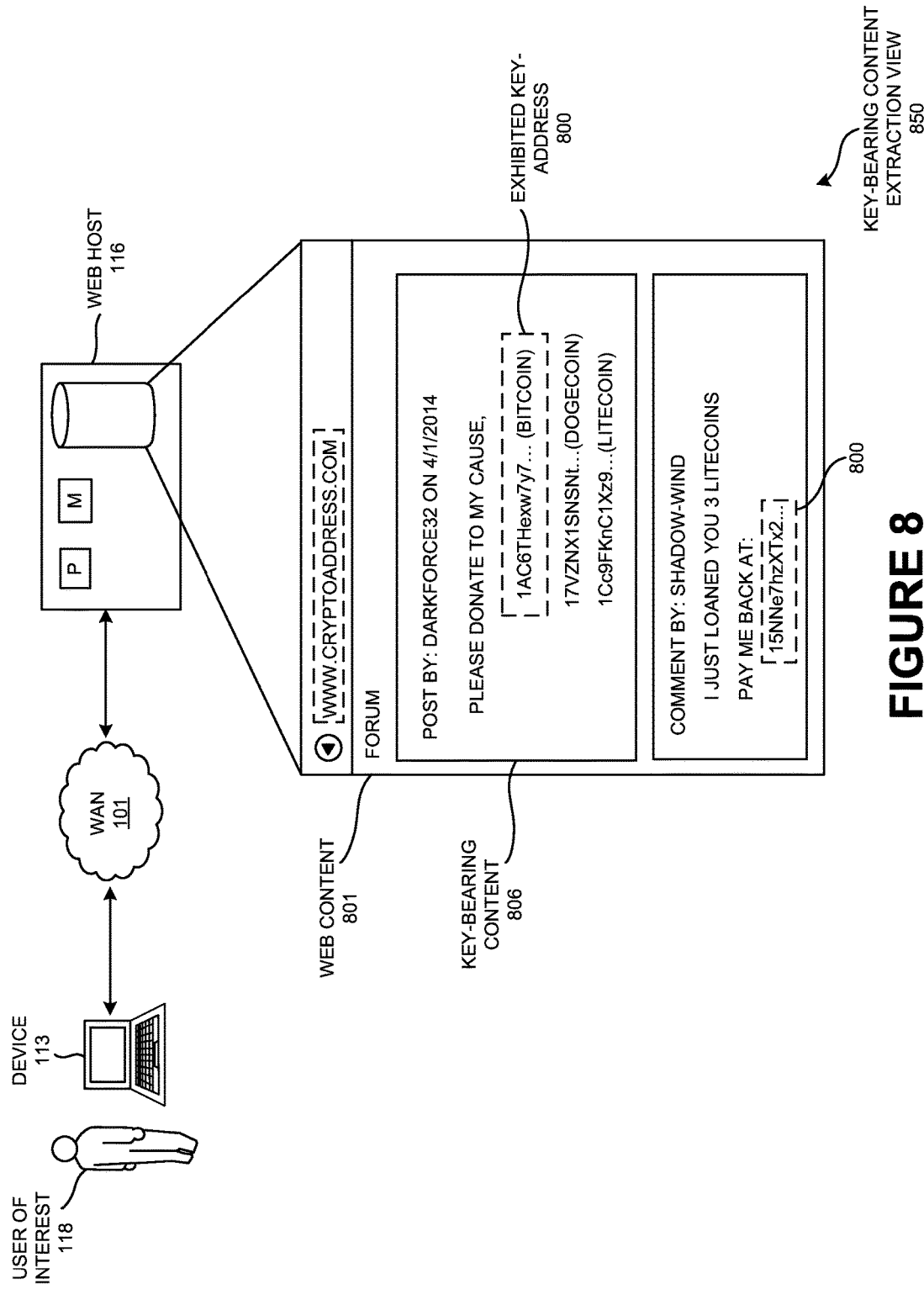
FIG. 8 is a key-bearing content extraction view that shows a web content posted on a web server of a web host by the user of interest and scanned by the collection server of FIG. 1 to determine that the web content contains a key-bearing content having an exhibited key-address, the collection server then scraping the web content to extract the exhibited key-address for addition to the user directory data and/or the enhanced ledger data, according to one or more embodiments.

FIG. 8 is a key-bearing content extraction view 850 that shows a web content posted on a web server of a web host by the user of interest and scanned by the collection server of FIG. 1 to determine that the web content contains a key-bearing content having an exhibited key-address, the collection server then scraping the web content to extract the exhibited key-address for addition to the user directory data and/or the enhanced ledger data, according to one or more embodiments. Particularly, FIG. 8 further illustrates an exhibited key-address 800, a web content 801, and a key-bearing content 806.

In FIG. 8, the user of interest 118 connects to a web server of the web host 116 through the wide area network 101 and edits and/or creates the web content 801. For example, the web content 801 may be a forum where information is shared, a social media profile (e.g., a Facebook profile), a wiki page, an online information directory, and/or a social media data. The web content 801 may be a markup language page. The online information directory may be an online cryptographic key directory for the users of the cryptographic currency to share a set of public key-addresses. The social media data may be a post, a profile content, an update, and/or a broadcast (e.g., a tweet of Twitter®). The user of interest 118 may edit the web content 801 to display the exhibited key-address 800 so that a different user of the cryptographic currency may send the transaction 304 to accomplish the value transfer 314 to the exhibited key-address 800. In such case, the exhibited key-address 800 may be the public key-address 300 of the output 308 of the transaction 304.

After the user 118 posts to and/or creates the web content 801, the exhibition scanning module 214 may scrape the web content 801 using a "web scraper" may determine that the web content 801 is the key-bearing content 806. The web scraper, for example, may operate by a grep command and/or a regular expression matching function. The web scraper may recognize the public key-address of the cryptographic currency by a hash format of the cryptographic currency. For example, the exhibited key-address 800 may be identified by the exhibition scanning module 214 by being a string of twenty-seven to thirty-four base-58 alphanumeric characters. The particular instance of the cryptographic currency to which the exhibited key-address 800 may belong may occur by analyzing the beginning character of the string. For example, either a numeral "1" and or numeral "3" may stand for the public key-address of the Bitcoin cryptographic currency. The Exhibition scanning module 214 may also reference the peer-verification ledger of one or more instances of the cryptographic currency to verify that a string of characters is the exhibited key-address 800. In addition to character recognition, the web scraper may have a semantic notation recognition that recognizes a semantics within the web content 801, the semantics commonly associated with and/or placed in conjunction with display of the public key-address (that may be the exhibited key-address 800).

Figure 9:
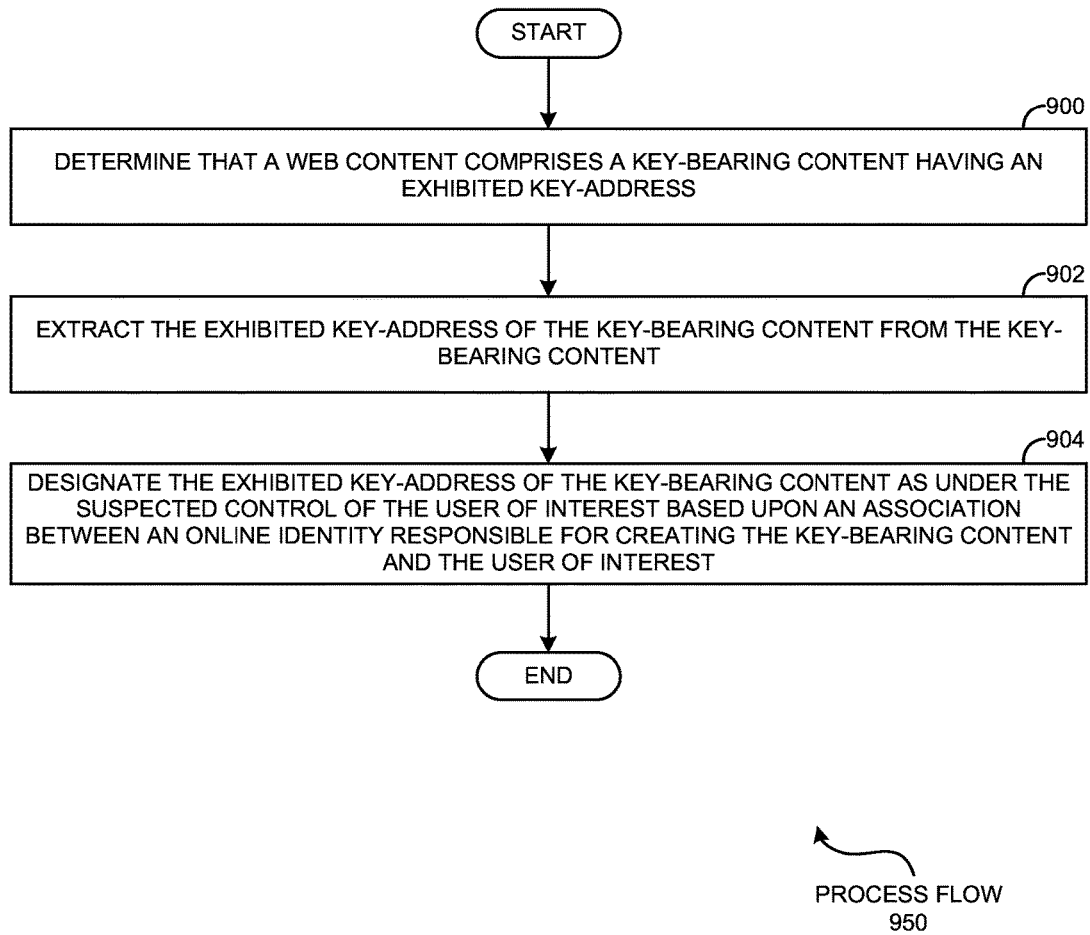
FIG. 9 is a process flow showing a set of operations that may be used to determine that the exhibited key-address of the key-bearing content of the web content is under the suspected control of the user of interest by associating the exhibited key-address with an online identity of the user of interest responsible for creating the web content, the suspected control of the user to be added to and maintained within the user directory data and/or the enhanced ledger data, according to one or more embodiments.

FIG. 9 is a process flow 950 showing a set of operations that may be used to determine that the exhibited key-address of the key-bearing content of the web content is under the suspected control of the user of interest by associating the exhibited key-address with an online identity of the user of interest responsible for creating the web content, the suspected control of the user to be added to and maintained within the user directory data and/or the enhanced ledger data, according to one or more embodiments. Operation 900 may determine that a web content comprises a key-bearing content having an exhibited key-address. The web content 801 may be, for example, the markup language page. Operation 902 may extract the exhibited key-address of the key-bearing content from the key-bearing content. Operation 904 may designate the exhibited key-address of the key-bearing content as under the suspected control of the user of interest based upon an association between an online identity responsible for creating the key-bearing content and the user of interest. For example, it may be known (e.g., logged and/or recorded within the directory server 100) that the user of interest 118 has the online identity "darkforce32" within a website of the web host. The association between the online identity and the user of interest 118 may arise through a variety of channels, for example by logging IP address of the internet protocol packet altering and/or creating the web content 801 when the IP address is known or suspected to be associated with the user of interest. Additional means of association between the online identity and the user of interest 118 may be used that are known in the art of surveillance and/or lawful interception.

FIG. 10 is an enhanced peer-verification ledger summary view 1050 that shows a summary of a set of blocks associated with a peer-verification ledger that is specifically a block chain of a Bitcoin cryptographic currency, the summary annotated with both a set of users of interest appearing within a particular block of the block chain and a set of alerts associated with activity of one or more of the set of the users of interest, according to one or more embodiments. Specifically, FIG. 10 further illustrates a block number 1000 of each block of a block chain, a block hash 1002 of each block, a time 1004 each block was solidified by a particular cryptographic node, a number of transactions 1006 within each block, a total BTC 1008 count of a sum total of the value transfer in a set of transactions within the each block, a size 1010 of each block in kilobytes, a user activity 1012 within each block, and an alerts 1014 associated with each block and/or the user activity 1012.

In FIG. 10, one embodiment of the enhanced ledger data 102 comprises a set of information of the block chain (which may be the Bitcoin implementation of the peer-verification ledger) as enhanced with data of the user activity 1012 and the alerts 1014 that may be associated with the user activity 1012 and/or additional suspicious activity such as an unusual transfer of value from an input key-address to an output key-address within one of the transactions comprising the block of the block chain (e.g., the block 1100 of FIG. 11). The enhanced ledger data 102 may form in real time by referencing the transactions of the peer-verification ledger as broadcast across the cryptocurrency network 110. In one embodiment, the enhanced ledger data 102 is comprised of an actual copy of the peer-verification ledger with the user activity 1012 and alerts 1014 appended to a dataset forming the peer-verification ledger.

The block number 1000 may be a sequential order of the blocks of the block chain going back to a first transaction of the cryptographic currency. A block having the highest number may be a forming unit of the peer-verification ledger, specifically, a forming block. A block having any other number may be a confirmed unit of the peer-verification ledger, specifically, a confirmed block. A common property of one or more instances of the cryptographic currency may be that a new block forms at approximately equal intervals of time (e.g., about 10 minutes). The block hash 1002 may be a unique identifier of each block that prevents a data comprising the block from being altered without drastically changing the identifier. The time 1004 may be a time in which the cryptographic node 112 received the block in a complete (e.g., solidified) form. The number of transactions 1006 may show the total instances of the transaction 304 that occur within the block, and the total BTC 1008 may show the total number of Bitcoins transferred from a set of input key-addresses to a set of output key-addresses within the block (e.g., a sum total of the value transfer 314 of each instance of the transaction within the block). The size 1010 may be the size of the block in kilobytes.

The user activity 1012 may show one or more instances of the user of interest 118 that may have transacted within the block. For example, as shown in FIG. 10, a 'User 1' may have the suspected control of the public key-address used as the input key-address and/or the output key-address of one or more instances of the transaction 304 within a block number 295212 and a block number 295229.

The analyst 122 may examine the enhanced ledger data in real-time to determine useful information about, execute surveillance on and/or gather intelligence about one or more instances of the user of interest 118. The analyst 122 may also set a condition for the alerts 1014, such as requesting the alert 1014 when a public key-address under the suspected control of a specific user of interest 118 transfers and/or receives over a certain value of the cryptographic currency. When one of the alerts 1014 set by the user is displayed, the analyst 122 may choose to inspect the block giving rise to the user activity 1012. For example, in the embodiment of FIG. 10, the alert 1014 may occur in association with a block number 295228 when an input key-address of the transaction 304 within that block is under a suspected control of a 'User 1' affiliated with an organized crime syndicate and an output key-address of the transaction 304 within the block is under the suspected control of a 'User 2' affiliated with a terrorist organization, indicating that there may be a new partnership between previous unrelated entities (e.g., a relationship between a first user of interest and a second user of interest). To learn more about the block and/or the transaction 304 giving rise to the alert 1014, the analyst 122 may click on, within a GUI displaying the enhanced ledger data, the block number 1000 corresponding to the alert 1014.

FIG. 11 is an enhanced ledger data individual block view 1150 showing a specific instance of an enhanced block embodied within the enhanced ledger data of FIG. 10, the enhanced block comprising a set of the transactions of FIG. 3 and modified to include the input key-address, the name of the user of interest associated with the input key-address, and the name of a different user of interest associated with the output key-address, according to one or more embodiments. Particularly, FIG. 11 further illustrates a block 1100, (specifically, a block 295228 of FIG. 10), a fee 1102, a size 1104 of each instance of the transactions 304 comprising the block 1100, a from (name) field 1106, a from (amount) field 1108, a to (name) field 1110, and a to (amount) field 1112.

In FIG. 11, the block 1100 is comprised of a number of instances of the transaction 304 of FIG. 3, each of which may be the enhanced transaction entry 202 of FIG. 2. The block 1100 is enhanced with the from (name) field 1106 and the to (name) field 1110. Each instance of the transaction 304 may have the transactional hash 302. Each instance of the transaction 304 may also have a fee 1102 deducted and awarded as part of the reward given to the participants of the cryptocurrency network 110. A particular transaction 304 of the block 1100 may also have the from (amount) field 1108 which may display one or more instances of the input key-address of the particular transaction 304, and may also have the to (amount) field 1112 which may display one or more instances of the output key-address for the particular transaction 304. For example, a transaction having the transactional hash 'a8eff390d1' may have the input key-address beginning '1PFBGey,' a first output key-address beginning '1EQQPKt' and a second output key-address '1PFBGey'. The second output key-address in the transaction having the transactional hash 'a8eff390d1' is identical to the input key-address, and may therefore be returning a portion of the value transfer 314 to a controller of the input key-address (e.g., the second output key-address may be the change key-address of 312 of FIG. 3).

The from (name) field 1106 and the from to (name) field 1110 may contain the name of the user of interest believed to have the suspected control of one or more instances of the public key-address 300 that comprise one or more instances of the input key-address and one or more instances of the output key-address.

Each user of interest 118 placed on the enhanced ledger data 102 may have a suspected control over one or more of the public key-addresses 300 that comprise the peer-verification ledger and/or the enhanced ledger data 102. The suspected control designation may be assigned and/or managed by the control verification module 212 of FIG. 2. The control verification module 212 may base the suspected control on a certainty of the information leading to a conclusion of association between the public key-address 300 and the user of interest 118. The certainty may be predefined and/or dynamically generated based on association analysis. The suspected control may be derived, for example, from the process of FIG. 3 through FIG. 9. The suspected control may also be derived from internal analysis of the use of public key-addresses within the peer-verification ledger. For example, in FIG. 11, an entire set of input key-addresses of the transaction 302 having the transactional hash beginning 'a0f3572ce7' may be determined to be under the suspected control of the user of interest 118 denoted 'User 2' being that 'User 2' has the suspected control of the input key-address beginning '1C73Yy.' Because there is a high certainty of the suspected control of 'User 2' over the input key-address '1C73Yy,' the high level of certainty may be imputed to all other instances of the input key-address of the transaction 304 having the transactional hash beginning 'a0f3572ce7.'

In another example, an internal analysis of the peer-verification ledger may determine that an output key-address is a change key-address returning a portion of the transfer of value of the transaction 304 to the controller the input key-address of the transaction 304. This determination may occur, for example, when within the transaction 304 an integer value of the cryptographic currency is transferred to a first output key-address and a decimal value of the cryptographic currency is transferred to a second key-address. Because the user of interest 118 may tend to think and/or transact with integers (and/or common fractions, such as 5.25, 3.125, 0.3333), the second key-address may tend to be an excess of the transfer of value 314 transferred back to the public key-address 300 controlled by the user of interest 118. Therefore, the suspected control may attach to the change key-address 312. For example, in FIG. 11, the transaction 302 having the transactional hash beginning 'a0f3572ce7' may have the change key-address 312 beginning '1Q6GE1' being that the output key-address beginning '1J6YYhM' received an integer amount of cryptographic currency, specifically 500 Bitcoins.

A specific public key-address 300 may be designated as under the suspected control of more than one instance of the user of interest 118 at a given time. However, due to the ease of generating a new public key-address, it may be unlikely that the specific public key-address 300 would be under the actual control of more than one instance of the user of interest 118. The actual control of the public key-address 300 may never be able to be fully determined. Rather, the suspected control may be stratified by the level of certainty into a set of provisional control levels and/or a verified control that may represent the highest level of certainty of the association between the user of interest 118 and the public key-address 300. In one embodiment, the enhanced ledger data 102, the user directory data 104 and/or the crypto bank profile 240 may only display to the analyst 122 a sub-set of public key-addresses under the suspected control of the user of interest 118 within a certain radius of the verified control. For example, the analyst may specify to apply a filter that only allows the from (name) field 1106 and/or the to (name) 1110 to display users of interest 118 with a suspected control of a verified state or a provisional certainty up to two levels below the verified state.

The control verification module 212 may also apply an algorithm that may adjust the designation of the suspected control of the public key-address 300 based upon its relationship to one or more additional instances of the public key-address 300. For example, where three instances of the public key-address 300 with a low certainty of association to the user of interest are used together as the input of the transaction, the control verification module may elevate the low certainty to a high certainty, which may be reflected as raising the provisional control designation from a '2' to a to and/or the verified control. As will be explained in conjunction with FIG. 13, the control verification module 212 may also designate the public key-address 300 as under the suspected control of the user of interest 118 based upon additional network data of the wide area network 101 as collected by the set of collection servers 106A through 106N.

FIG. 12 is a user directory data view 1250 showing the user directory data of FIG. 1 comprising a set of public key-addresses that are under the suspected control a set of users of interest, the public key-addresses spanning several types of the cryptographic currency and each public key-address having the suspected control stratified into a verified control state and a set of provisional control states, the verified control state and the set of provisional control states corresponding to a certainty that the public key-address is associated with the particular user of interest, according to one or more embodiments. Particularly, FIG. 12 further illustrates a name field 1200, a currency field 1202, a public key-address field 1204, a suspected control value field 1206, a balance field 1208, a last block field 1210, a last transaction hash field 1212, and a private key field 1214.

In FIG. 12, the user directory data may be a way for the analyst 122 to view a set of the public key-addresses 300 as organized by the user of interest 118 that have the suspected control of a subset of the public key-addresses 300. A set of pre-populated key-addresses within the user directory data may be derived from a set of previous transactions of the peer-verification ledger. The set of key addresses within the user directory data may also be updated in a real time by referencing a current copy of the peer-verification ledger as present in a cryptographic mining operation. The subset of public key-addresses 300 under the suspected control of the user of interest 118 may be organized into the crypto bank profile 240, which may have a distinct graphical user interface. The crypto bank profile 240 may be comprised of a set of instances of the public key-address 300 within the control radius of the verified control. In FIG. 12, the control radius may be quite broad, as even the lowest form of the suspected control, 'Provisional 1,' is shown comprising the crypto bank profile 240 of 'User 2.'

Within the name field 1200 may be placed the true name of the user of interest 118 (e.g., "William Smith," "Organization X") and/or an online identity (e.g., a handle such as "User_259" or an email address such as "xyz@gmail.com"). The currency field 1202 may display the particular instance of the currency associated with the public key-address 300 of the public key-address field 1204. The suspected control value field 1206 may contain the suspected control of the user of interest 118 over the public key-address 300, and the balance field 1208 may contain a remaining balance of the cryptographic currency remaining on the public key-address 300 shown in public key-address field 1204. The remaining balance may ordinarily be able to be determined from examination of the peer-verification ledger.

The last block field 1210 may show the last block that the public key-address 300 uses used in (e.g., used as an input key-address and/or an output key-address) and may allow the analyst to click on a link within the GUI displaying the user directory data to allow the user to view the block (e.g., the block 1100 of FIG. 11). Similarly, the last transaction hash field 1212 may contain the last transactional hash 302 in which the public key-address 300 may have been used as the input key-address and/or the output key-address. Similar to the last block field 1210, a link for each entry may allow the analyst 122 to inspect a detailed view of the transaction 304 associated with the transactional hash 302.

Finally, the private key field 1214 may contain the private key corresponding to the public key-address 300. In many instances, the private key will not be known. However, in some cases, the private key may form part of a communication between the user of interest 118 and the correspondent 120, for example when the user of interest 118 relays the private key through the point-to-point packet 601 so that both the user of interest 118 and the correspondent 120 may have a joint control over the corresponding instance of the public key-address 300. Configuring the set of collection servers 106A through 106N to find and extract the private key may have an additional utility. In some cases, the public key-address 300 may be stored in a "wallet" file on the device 113 of the user of interest 118 to manage a corresponding private key. A hacker may attempt to export files associated with the wallet quickly and in an unencrypted format to effectuate a value transfer from a set of public key-addresses 300 within the wallet and thus steal the cryptographic currency. In such case, the transaction identification module 210 may be able to spot the private key within a wallet .DAT file format (and/or an additional format suitable to export the private key), along with the IP address 303 of the TCP/IP layer of the internet protocol packet carrying the wallet .DAT file format, to help catch the thief. Identification of the private key for a user of interest 118 may also allow the analyst 122 to "seize" the value associated with the corresponding public key-address 300 by effectuating the value transfer 314 from the corresponding public key-address 300 to a different public key-address 300 under the actual control of the analyst 122.

A penultimate entry of FIG. 12 may show the user directory data 104 may be a newly generated instance of the public key-address 300 that has not yet been used in the transaction 304. The unused instance may be the relayed key-address 600 that have been acquired, for example, as part of the key-bearing communication 606 and added to the user directory data 104 as operation 706 and 708 of FIG. 7.

Figure 13:
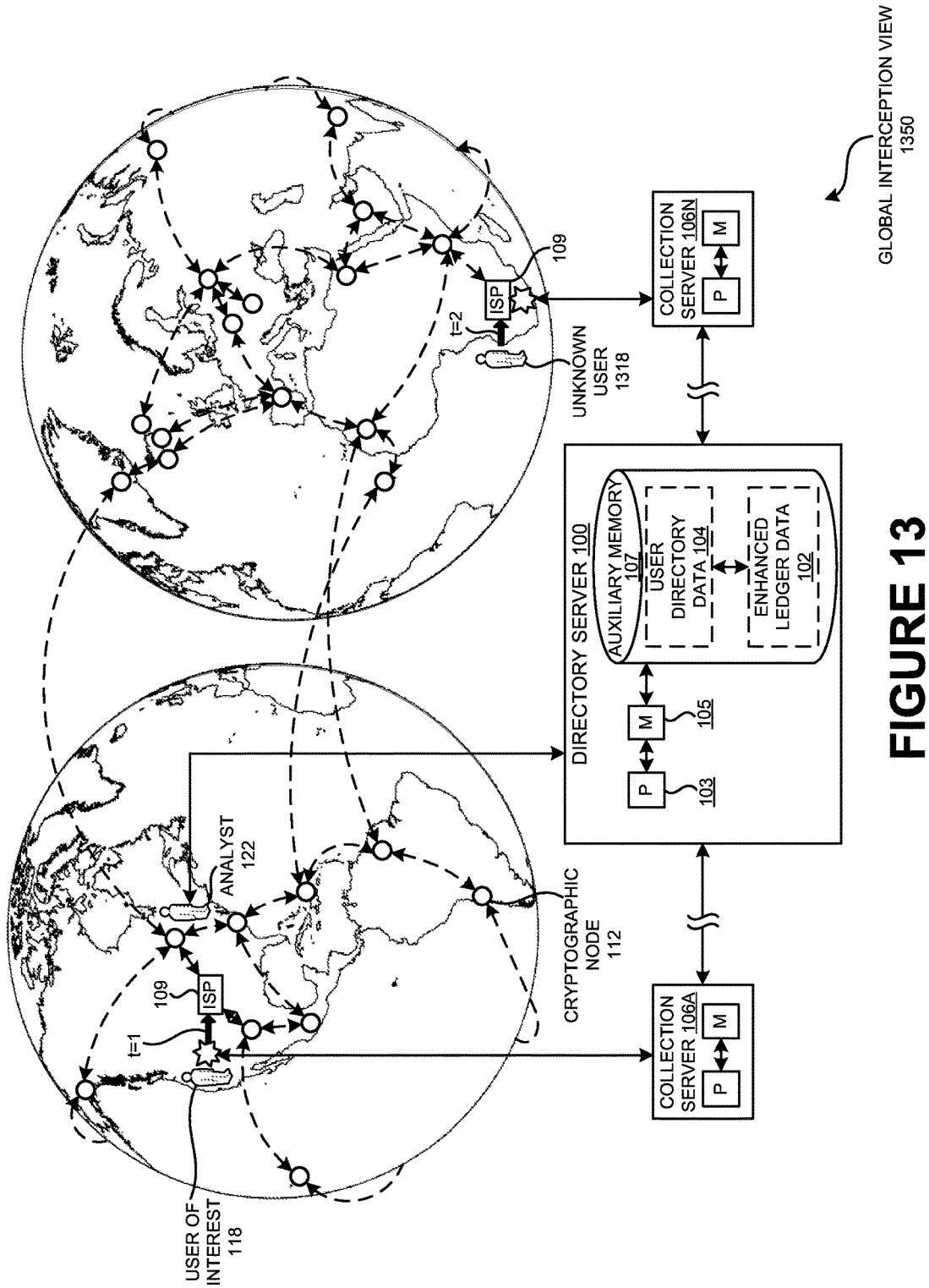
FIG. 13 is a global interception view showing the propagation of the transaction of the user of interest across the cryptocurrency network of FIG. 1 at a first time, a later transaction initiated by an unknown user at a second time, the unknown user determined not to be the user of interest based upon a comparison of an estimated travel time between a geographic origin of the transaction and a geographic origin of the later transaction when compared to an elapse time between the transaction and the later transaction as analyzed by the directory server of FIG. 2.

FIG. 13 is a global interception view 1350 showing the propagation of the transaction of the user of interest across the cryptocurrency network of FIG. 1 at a first time, a later transaction initiated by an unknown user at a second time, the unknown user determined not to be the user of interest based upon a comparison of an estimated travel time between a geographic origin of the transaction and a geographic origin of the later transaction when compared to an elapse time between the transaction and the later transaction as analyzed by the directory server of FIG. 2. Particularly, FIG. 13 further illustrates an unknown user 1318.

In FIG. 13, a user of interest 118, who may be located in Vancouver, B.C., may propagate the transaction 304 across the cryptocurrency network 110, which may be a global network enabled by the wide area network 101. The transaction 304 may have the output 308 comprising a first output key-address and a second output key-address. The collection server 106A may intercept the propagation packet 301 of the transaction 304 on the edge of cryptocurrency network 110 and/or the edge of the wide area network 101 at a first time 't=1'. According to the process of FIG. 3 through FIG. 5, the directory server 100 may then process the IP address known or suspected to be associated with the user of interest 118 in order to designate the input key-address of the transaction 304 as under the suspected control of the user of interest 118.

At a second time 't=2', the unknown user 1318, who may be located in Cape Town, South Africa, may propagate a later transaction using the second output key-address as the next key-address of a new input of the later transaction. When the average travel distance between Vancouver, B.C., and Cape Town, South Africa may take approximately 23 hours by a commercial airliner, and an elapse time between the first time and the second time is less than 12 hours, the directory server 100 may determine that the first output key-address is the change key-address of the transaction 304 and place the first output key-address under the suspected control of the user of interest 118.

In one embodiment, a method for multimodal cryptographic key-address mapping includes using a computer processor 103 and a volatile memory 105 to determine that a propagation packet 301 is a transaction 304 of a cryptographic currency propagating across a network 101 for integration into a peer-verification ledger 200. The transaction 304 includes a value transfer 314 of the cryptographic currency between an input key-address of an input 306 of the transaction 304 and an output key-address of an output 308 of the transaction 304. The method also extracts an IP address 303 from a TCP/IP layer of the propagation packet 301 associated with the transaction 304, and additionally extracts from the transaction 304 a transactional hash 302 associated with the input 306 of the transaction 304. The transactional hash 302 references a previous output 308 of a previous transaction 304.

Further, the method analyzes the peer-verification ledger 200 to determine the input key-address associated with the transactional hash 302 referencing the previous output. The input key-address of the input 306 of the transaction 304 of the cryptographic currency propagating across the network 101 for integration into the peer-verification ledger 200 is then extracted. Next, the IP address 303 from the TCP/IP layer of the propagation packet 301 is linked with the input key-address of the input 306 of the transaction 304. The method also determines that the input key-address of the input 306 of the transaction 304 is under a suspected control of a user of interest 118 based upon an association between the user of interest 118 and the IP address 303 extracted from the TCP/IP layer of the propagation packet 301 of the transaction 304.

The method may further include stratifying, within a user directory data 104, a designation of the suspected control of the input key-address of the input 306 of the transaction 304 into one or more designations of a provisional control and a designation of a verified control. This designation may be based upon a predetermined certainty of the association between the user of interest 118 and the IP address 303 extracted from the TCP/IP layer of the propagation packet 301 of the transaction 304.

The propagation packet 301 may be determined to be the transaction 304 of the cryptographic currency based upon the identification, within an application layer protocol 305 of the propagation packet 301, of a magic number associated with a specific cryptographic currency and/or the magic number located in a header field of the application layer protocol 305. A byte size of the propagation packet 301 and a hash format associated with the specific cryptographic currency may also be used to determine the presence of the propagation packet 301. The method may also determine that a point-to-point packet 601 relayed between the user of interest 118 and a correspondent 120 of the user of interest 118 is a key-bearing communication 606 that includes a relayed key-address 606 of the key-bearing communication 606. The key-bearing communication 606 may be a chat note, a social media message, a text message, and/or a voice call. The relayed key-address 606 of the key-bearing communication 606 may be extracted from the key-bearing communication 606, and it may be determined that the user directory data 104 includes the relayed key-address 606 of the key-bearing communication 606.

When the user directory data 104 does not include the relayed key-address 606 of the key-bearing communication 606, the method may create a new entry for the relayed key-address 606 within the user directory data 104. Similarly, it may be designated, within the user directory data 104, that the relayed key-address 606 of the key-bearing communication 606 as under the suspected control of the user of interest 118.

The method may also stratify, within the user directory data 104, the designation of the suspected control of the relayed key-address 606 of the key-bearing communication 606 into one or more designations of the provisional control and the designation of the verified control. The stratification may be based upon a predetermined certainty of the association between the user of interest 118 and an IP address 303 of the key-bearing communication 606 extracted from the TCP/IP layer of the peer-to-peer packet and/or an online identity associated with a transmission of the key-bearing communication 606. The point-to-point packet 601 may be identified as associated with the key-bearing communication 606 based on a length of a character string of the relayed key-address 606 of the key-bearing communication 606, a leading character of the character string of the relayed key-address 606 of the key-bearing communication 606, and/or the character string of the relayed key-address 606 of the key-bearing communication 606 being a base-58 alpha-numeric format.

The method may also determine that a web content 801 comprises a key-bearing content 806 having an exhibited key-address 800 of the key-bearing content 806. The key-bearing content 806 may be a markup language page, a forum post, an online cryptographic key directory entry, and/or a social media data. Additionally, using a web-scraper, the exhibited key-address 800 of the key-bearing content 806 may be extracted from the key-bearing content 806. Following this process, and within the user directory data 104, the exhibited key-address 800 of the key-bearing content 806 may be designated as under the suspected control of the user of interest 118 based upon an association between the online identity responsible for creating the key-bearing content 806 and the user of interest 118.

The method may consolidate a set of key-addresses within a control radius of the verified control of the user of interest 118 into a crypto bank profile 240 corresponding to the user of interest 118, and additionally verify that the transaction 304 has been incorporated into a forming unit of the peer-verification ledger 200 and/or a confirmed unit of the peer-verification ledger 200. A majority of a set of prepopulated key-addresses within the user directory data 104 may be derived from a set of previous transactions of the peer-verification ledger 200.

Also, when a first key-address of a specific stratum of the provisional control of the user of interest 118 and a second key-address of an unknown control are both used as the input 306 of the transaction 304, the method may designate, within the user directory data 104, the second key-address of the input 306 of the transaction 304 as under the specific stratum of the provisional control of the user of interest 118. Similarly, when a third key-address under a first stratum of provisional control of the user of interest 118 and a fourth key-address under a second stratum of provisional control of the user of interest 118 are both used as the input 306 of the transaction 304, the method may elevate the designation of the third key-address and the designation of the fourth key-address to be under the verified control or a third stratum of provisional control closer in certainty to the verified control as measured by the control radius.

It may also be determined, when the transaction 304 has a first key-address of the output 308 of the transaction 304 and a second key-address of the output 308 of the transaction 304, that the first key-address of the output 308 of the transaction 304 is a change key-address 312 returning a portion of the value transfer 314 of the transaction 304 back to the user of interest 118 associated with the input key-address of the input 306 of the transaction 304. The first key-address of the output 308 of the transaction 304 may be identified as the change key-address 312. This identification may occur by determining that the transfer of the value to the second key-address of the output 308 of the transaction 304 is an approximate integer multiple of a unit of the cryptographic currency. The identification may also occur by determining, when the second key-address of the output 308 of the transaction 304 is used as a next key-address of a new input 306 of a later transaction, that traveling a distance between a geographic origin of the transaction 304 and the later transaction 304 would be physically impracticable for a suspected controller of both the second key-address of the output 308 of the transaction 304 and the next key-address of the new input 306 of the later transaction 304 within an elapse time of the transaction 304 and the later transaction 304. The method may designate, within the user directory data 104, the change key-address 312 as under the suspected control of the user of interest 118.

The method also applies to specific mechanisms of the cryptographic currency. For example, the peer-verification ledger 200 may be a block chain data with the forming unit being a forming block of the block chain data and the confirmed unit being a confirmed block of the block chain data. The method also applies to specific types of the cryptographic currency. For example, the cryptographic currency may be a bitcoin currency, and the hash format may be a string of twenty-seven to thirty-four base-58 alphanumeric characters beginning with a numeral "1" or a numeral "3".

In another embodiment, a method includes determining that a propagation packet 301 is a transaction 304 of a cryptographic currency propagating across a network 101 for integration into a peer-verification ledger 200, the transaction 304 including a value transfer 314 of the cryptographic currency between an input key-address of an input 306 of the transaction 304 and an output key-address of an output 308 of the transaction 304. Next, an IP address 303 from a TCP/IP layer of the propagation packet 301 associated with the transaction 304 is extracted. Similarly extracted from the transaction 304 is a transactional hash 302 associated with the input 306 of the transaction 304. The transactional hash 302 referencing a previous output 308 of a previous transaction 304.

The peer-verification ledger 200 is then analyzed to determine the input key-address associated with the transactional hash 302 referencing the previous output. The input key-address of the input 306 of the transaction 304 of the cryptographic currency propagating across the network 101 for integration into the peer-verification ledger 200 is then extracted, allowing for the linking of the IP address 303 from the TCP/IP layer of the propagation packet 301 with the input key-address of the input 306 of the transaction 304. Within an enhanced ledger data 102 it is then designated that the input key-address of the input 306 of the transaction 304 as under a suspected control of a user of interest 118 based upon an association between the user of interest 118 and the IP address 303 extracted from the TCP/IP layer of the propagation packet 301 of the transaction 304.

In yet another embodiment, a system includes a collection server 106 associated with an access point 108 and having a computer processor 103 and physical memory. The collection server 106 intercepts an internet protocol packet determined by the collection server 106 to have an association with a transaction 304 of a cryptographic currency propagating across a network 101 for integration into a peer-verification ledger 200 and/or a key-bearing communication 606 between a user of interest 118 and a correspondent 120 of the user of interest 118.

The system also includes an IP extraction module 208 to extract an IP address 303 from a TCP/IP layer of the propagation packet 301 associated with the transaction 304 and/or the key-bearing communication 606. A key extraction module 206 extracts a transactional hash 302 of an input 306 of the transaction 304 of the cryptographic currency propagating across the network 101 for integration into the peer-verification ledger 200 and/or extracts a relayed key-address 606 of the key-bearing communication 606 between the user of interest 118 and the correspondent 120 of the user of interest 118. Finally, the system includes a network 101, a cryptocurrency network 110, and a directory server 100 that houses a ledger copy data, a user directory data 104, and/or an enhanced ledger data.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structure and methods may be embodied using transistors, logic gates, and electrical circuits (e.g., application specific integrated (ASIC) circuitry and/or Digital Signal Processor (DSP) circuitry).

In addition, it will be appreciated that the various operations, processes and methods disclosed herein may be embodied in a non-transitory machine-readable medium and/or a machine-accessible medium compatible with a data processing system (e.g., the set of collection servers 106A through 106N, the directory server 100). Accordingly, the specification and drawings are to be regarded in an illustrative rather than a restrictive sense.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the preceding disclosure.

What is claimed is:

1. A method, using a computer processor and a physical memory, comprising:
   determining that a propagation packet is a transaction of a cryptographic currency propagating across a network for integration into a peer-verification ledger based on identification within an application layer protocol of the propagation packet at least one of: a magic number associated with a specific cryptographic currency, a byte size of the propagation packet, and a hash format associated with the specific cryptographic currency, the magic number located in a header field of the application layer protocol, and the transaction comprising a value transfer of the cryptographic currency between an input key-address of an input of the transaction and an output key-address of an output of the transaction;
   extracting an IP address from a TCP/IP layer of the propagation packet associated with the transaction;
   extracting, from the transaction, a transactional hash associated with the input of the transaction, the transactional hash referencing a previous output of a previous transaction;

analyzing the peer-verification ledger to determine the input key-address associated with transactional hash referencing the previous output;

extracting the input key-address of the input of the transaction of the cryptographic currency propagating across the network for integration into the peer-verification ledger;

linking the IP address from the TCP/IP layer of the propagation packet with the input key-address of the input of the transaction;

determining that the input key-address of the input of the transaction is under a suspected control of a user of interest based on an association between the user of interest and the IP address extracted from the TCP/IP layer of the propagation packet of the transaction;

stratifying, within a user directory data, a designation of the suspected control of the input key-address of the input of the transaction into one or more designations of a provisional control and a designation of a verified control, based on a predetermined certainty of the association between the user of interest and the IP address extracted from the TCP/IP layer of the propagation packet of the transaction;

determining that a point-to-point packet relayed between the user of interest and a correspondent of the user of interest is a key-bearing communication comprising a relayed key-address of the key-bearing communication, the key-bearing communication being at least one of an email, a chat note, a social media message, a text message and a voice call;

extracting the relayed key-address of the key-bearing communication from the key-bearing communication;

determining that the user directory data includes the relayed key-address of the key-bearing communication;

when the user directory data does not include the relayed key-address of the key-bearing communication, creating a new entry for the relayed key-address within the user directory data;

designating, within the user directory data, the relayed key-address of the key-bearing communication as under the suspected control of the user of interest;

identifying the point-to-point packet as associated with the key-bearing communication based on at least one of a length of a character string of the relayed key-address of the key-bearing communication, a leading character of the character string of the relayed key-address of the key-bearing communication, and the character string of the relayed key-address of the key-bearing communication being a base-58 alpha-numeric format; and stratifying, within the user directory data, the designation of the suspected control of the relayed key-address of the key-bearing communication into the one or more designations of the provisional control and the designation of the verified control, based upon a predetermined certainty of an association between the user of interest and at least one of an IP address of the key-bearing communication extracted from the TCP/IP layer of the peer-to-peer packet and an online identity associated with a transmission of the key-bearing communication.

2. The method of claim 1, further comprising:

determining that a web content comprises a key-bearing content having an exhibited key-address of the key-bearing content, wherein the key-bearing content is at least one of a markup language page, a forum post, an online cryptographic key directory entry, and a social media data;

using a web-scraper, extracting the exhibited key-address of the key-bearing content from the key-bearing content; and designating, within the user directory data, the exhibited key-address of the key-bearing content as under the suspected control of the user of interest based on an association between an online identity responsible for creating the key-bearing content and the user of interest.

3. The method of claim 2, further comprising:

consolidating a set of key-addresses within a control radius of the verified control of the user of interest into a crypto bank profile corresponding to the user of interest.

4. The method of claim 3, further comprising:

verifying that the transaction has been incorporated into at least one of a forming unit of the peer-verification ledger and a confirmed unit of the peer-verification ledger, a majority of a set of pre-populated key-addresses within the user directory data being derived from a set of previous transactions of the peer-verification ledger.

5. The method of claim 4, further comprising:

when a first key-address of a specific stratum of the provisional control of the user of interest and a second key-address of an unknown control are both used as the input of the transaction, designating, within the user directory data, the second key-address of the input of the transaction as under the specific stratum of the provisional control of the user of interest; and when a third key-address under a first stratum of the provisional control of the user of interest and a fourth key-address under a second stratum of the provisional control of the user of interest are both used as the input of the transaction, elevating the designation of the third key-address and the designation of the fourth key-address to be under at least one of the verified control and a third stratum of the provisional control closer in certainty to the verified control as measured by the control radius.

6. The method of claim 5, further comprising:

determining, when the transaction has a first key-address of the output of the transaction and a second key-address of the output of the transaction, that the first key-address of the output of the transaction is a change key-address returning a portion of the value transfer of the transaction back to the user of interest associated with the input key-address of the input of the transaction, wherein the first key-address of the output of the transaction is identified as the change key-address by at least one of:

determining that the value transfer to the second key-address of the output of the transaction is an approximate integer multiple of a unit of the cryptographic currency; and determining, when the second key-address of the output of the transaction is used as a next key-address of a new input of a later transaction, that traveling a distance between a geographic origin of the transaction and the later transaction would be physically impracticable for a suspected controller of both the second key-address of the output of the transaction and the next key-address of the new input of the later transaction within an elapse time of the transaction and the later transaction; and designating, within the user directory data, the change key-address as under the suspected control of the user of interest.

7. The method of claim 6, wherein the peer-verification ledger is a block chain data, wherein the forming unit is a forming block of the block chain data and the confirmed unit is a confirmed block of the block chain data, wherein the cryptographic currency is a bitcoin currency, and wherein the hash format is a string of twenty-seven to thirty-four base-58 alphanumeric characters beginning with at least one of a numeral "1" and a numeral "3".

8. A method, using a computer processor and physical memory, comprising:

determining that a propagation packet is a transaction of a cryptographic currency propagating across a network for integration into a peer-verification ledger, the transaction comprising a value transfer of the cryptographic currency between an input key-address of an input of the transaction and an output key-address of an output of the transaction;

extracting an IP address from a TCP/IP layer of the propagation packet associated with the transaction;

extracting, from the transaction, a transactional hash associated with the input of the transaction, the transactional hash referencing a previous output of a previous transaction;

analyzing the peer-verification ledger to determine the input key-address associated with the transactional hash referencing the previous output;

extracting the input key-address of the input of the transaction of the cryptographic currency propagating across the network for integration into the peer-verification ledger;

linking the IP address from the TCP/IP layer of the propagation packet with the input key-address of the input of the transaction;

designating, within an enhanced ledger data, the input key-address of the input of the transaction as under a suspected control of a user of interest based on an association between the user of interest and the IP address extracted from the TCP/IP layer of the propagation packet of the transaction;

determining that a point-to-point packet relayed between the user of interest and a correspondent of the user of interest is a key-bearing communication comprising a relayed key-address of the key-bearing communication, the key-bearing communication being at least one of an email, a chat note, a social media message, a text message, and a voice call;

extracting the relayed key-address of the key-bearing communication from the key-bearing communication;

designating, within the enhanced ledger data, the relayed key-address of the key-bearing communication as under the suspected control of the user of interest;

determining that a web content comprises a key-bearing content having an exhibited key-address of the key-bearing content, the key-bearing content being at least one of a markup language page, a forum post, an online cryptographic key directory entry, and a social media data;

using a web-scraper, extracting the exhibited key-address of the key-bearing content from the key-bearing content; and designating, within the enhanced ledger data, the exhibited key-address of the key-bearing content as under the suspected control of the user of interest based on an association between an online identity responsible for creating the key-bearing content and the user of interest.

9. The method of claim 8, further comprising:

stratifying, within the enhanced ledger data, a designation of the suspected control into one or more designations of a provisional control and a designation of a verified control, based upon a predetermined certainty of an association giving rise to the designation of the suspected control; and updating a data set of the enhanced ledger data comprising a set of previously used key-addresses and a set of transactions in substantially real-time by referencing an active copy of the peer-verification ledger, the active copy of the peer-verification ledger being the same as is present in a cryptographic mining operation of the cryptographic currency.

10. A system comprising:

a collection server associated with an access point and having a computer processor and a physical memory, to intercept an internet protocol packet determined by the collection server to have an association with at least one of a transaction of a cryptographic currency propagating across a network for integration into a peer-verification ledger and a key-bearing communication between a user of interest and a correspondent of the user of interest;

an IP extraction module to extract an IP address from a TCP/IP layer of the propagation packet associated with the at least one of the transaction and the key-bearing communication;

a key extraction module to extract at least one of a transactional hash of an input of the transaction of the cryptographic currency propagating across the network for integration into the peer-verification ledger and a relayed key-address of the key-bearing communication between the user of interest and the correspondent of the user of interest;

the network;

a cryptocurrency network;

a directory server, to house at least one of a user directory data, an enhanced ledger data and a ledger copy data;

a cryptographic node, to house an active copy of the peer-verification ledger as present in a cryptographic mining operation; and a control verification module, to stratify a designation of a suspected control into one or more designations of a provisional control and a designation of a verified control, based upon a predetermined certainty of an association giving rise to the designation of the suspected control.

11. The system of claim 10, wherein the directory server is further configured to:

determine that a web content comprises a key-bearing content having an exhibited key-address of the key-bearing content, the key-bearing content being at least one of a markup language page, a forum post, an online cryptographic key directory entry, and a social media data, using a web-scraper, extract the exhibited key-address of the key-bearing content from the key-bearing content, designate, within the user directory data, the exhibited key-address of the key-bearing content as under the suspected control of the user of interest based on an association between an online identity responsible for creating the key-bearing content and the user of interest, consolidate a set of key-addresses within a control radius of the verified control of the user of interest into a crypto bank profile corresponding to the user of interest, verify that the transaction has been incorporated into at least one of a forming unit of the peer-verification ledger and a confirmed unit of the peer-verification ledger, a majority of a set of pre-populated key-addresses within the user directory data being derived from a set of previous transactions of the peer-verification ledger, when a first key-address of a specific stratum of the provisional control of the user of interest and a second key-address of an unknown control are both used as the input of the transaction, designate, within the user directory data, the second key-address of the input of the transaction as under the specific stratum of the provisional control of the user of interest, and when a third key-address under a first stratum of the provisional control of the user of interest and a fourth key-address under a second stratum of the provisional control of the user of interest are both used as the input of the transaction, elevate the designation of the third key-address and the designation of the fourth key-address to be under at least one of the verified control and a third stratum of the provisional control closer in certainty to the verified control as measured by the control radius.

12. The system of claim 11, wherein the directory server is further configured to:

determine, when the transaction has a first key-address of an output of the transaction and a second key-address of the output of the transaction, that the first key-address of the output of the transaction is a change key-address returning a portion of a value transfer of the transaction back to the user of interest associated with an input key-address of the input of the transaction, wherein the first key-address of the output of the transaction is identified as the change key-address by at least one of:

determining that the value transfer to the second key-address of the output of the transaction is an approximate integer multiple of a unit of the cryptographic currency, and determining, when the second key-address of the output of the transaction is used as a next key-address of a new input of a later transaction, that traveling a distance between a geographic origin of the transaction and the later transaction would be physically impracticable for a suspected controller of both the second key-address of the output of the transaction and the next key-address of the new input of the later transaction within an elapse time of the transaction and the later transaction, and designate, within the user directory data, the change key-address as under the suspected control of the user of interest, wherein the peer-verification ledger is a block chain data, wherein the forming unit is a forming block of the block chain data and the confirmed unit is a confirmed block of the block chain data, wherein the cryptographic currency is a bitcoin currency, and wherein a hash format of the cryptographic currency is a string of twenty-seven to thirty-four base-58 alphanumeric characters beginning with at least one of a numeral "1" and a numeral "3".

\* \* \* \* \*